United States Patent
Hirano et al.

(10) Patent No.: US 11,831,769 B2
(45) Date of Patent: Nov. 28, 2023

(54) REGISTRATION DEVICE, SERVER DEVICE, SEARCHABLE ENCRYPTION SYSTEM, AND SEARCHABLE ENCRYPTION METHOD

(71) Applicant: MITSUBISHI ELECTRIC CORPORATION, Tokyo (JP)

(72) Inventors: Takato Hirano, Tokyo (JP); Yutaka Kawai, Tokyo (JP); Yoshihiro Koseki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 480 days.

(21) Appl. No.: 17/021,533

(22) Filed: Sep. 15, 2020

(65) Prior Publication Data
US 2020/0412536 A1     Dec. 31, 2020

Related U.S. Application Data

(63) Continuation of application No. PCT/JP2018/017792, filed on May 8, 2018.

(51) Int. Cl.
*H04L 9/14* (2006.01)
*G06F 16/901* (2019.01)
(Continued)

(52) U.S. Cl.
CPC .............. *H04L 9/14* (2013.01); *G06F 16/901* (2019.01); *G06F 16/951* (2019.01); *G09C 1/02* (2013.01); *H04L 9/30* (2013.01)

(58) Field of Classification Search
CPC . H04L 9/14; H04L 9/30; G06F 16/901; G06F 16/951; G09C 1/02
See application file for complete search history.

(56) References Cited

U.S. PATENT DOCUMENTS 9,251,097 B1 * 2/2016 Kumar ................. G06F 11/1076
9,904,788 B2 * 2/2018 Kumar ................. H04L 9/0825
(Continued)

FOREIGN PATENT DOCUMENTS

CN          104394155 A  *  3/2015  .......... G06F 16/903
DE    11 2014 007 083 T5     7/2017
(Continued)

OTHER PUBLICATIONS

Chase et al., "Structured Encryption and Controlled Disclosure", ASIACRYPT2010, Lecture Notes in Computer Science 6477, Dec. 5, 2010, total 26 pages.
(Continued)

*Primary Examiner* — Yonas A Bayou
(74) *Attorney, Agent, or Firm* — Birch, Stewart, Kolasch & Birch, LLP

(57) ABSTRACT

A registration device (200) generates an encryption keyword by encrypting a keyword with a registration key, generates an index including the encryption keyword and identification information which identifies a corresponding ciphertext, generates a conversion key from the registration key and a search key, and registers a plurality of ciphertexts, the index, and the conversion key in a server device (400). A search device (300) generates a search query by encrypting a keyword, and transmits the search query to the server device (400). The server device (400) generates a re-encryption keyword by re-encrypting the search query with the registered conversion key, searches the registered index with the re-encryption keyword, acquires, from the index, the identification information if the encryption keyword is obtained as a search result, extracts a ciphertext identified by the identification information from the registered plurality of ciphertexts, and transmits the extracted ciphertext to the search device (300).

13 Claims, 18 Drawing Sheets

(51) Int. Cl.
*G06F 16/951* (2019.01)
*H04L 9/30* (2006.01)
*G09C 1/02* (2006.01)

(56) References Cited

U.S. PATENT DOCUMENTS

| | | | |
|---|---|---|---|
| 10,523,417 B2* | 12/2019 | Lee | H04L 9/00 |
| 10,686,827 B2* | 6/2020 | Schutz | H04L 63/1441 |
| 10,936,729 B2* | 3/2021 | Kumar | H04L 9/0822 |
| 11,144,663 B2* | 10/2021 | Yavuz | G06F 21/602 |
| 2009/0300351 A1 | 12/2009 | Lei et al. | |
| 2013/0046974 A1* | 2/2013 | Kamara | G06F 21/6218 |
| | | | 713/165 |
| 2013/0148803 A1 | 6/2013 | Jho et al. | |
| 2015/0229611 A1 | 8/2015 | Kaushik et al. | |
| 2016/0191544 A1* | 6/2016 | Kim | H04L 63/105 |
| | | | 713/171 |
| 2016/0299924 A1 | 10/2016 | Fujimoto et al. | |
| 2017/0026350 A1 | 1/2017 | Dawoud | |
| 2017/2288858 | 10/2017 | Hirano et al. | |
| 2018/0124026 A1 | 5/2018 | Dawolid | |
| 2019/0124052 A1 | 4/2019 | Dawoud | |

FOREIGN PATENT DOCUMENTS

| | | |
|---|---|---|
| JP | 2010-61103 A | 3/2010 |
| JP | 2013-148822 A | 8/2013 |
| JP | 2016-12897 A | 1/2016 |
| JP | 2016-200938 A | 12/2016 |
| JP | 2017-37180 A | 2/2017 |

OTHER PUBLICATIONS

International Search Report, issued in PCT/JP2018/017792, PCT/ISA/210, dated Aug. 14, 2018.

Popa et al., "Multi-Key Searchable Encryption", IACR Cryptology ePrint Archive: Report 2013/508, Aug. 16, 2013, total 19 pages.

Curtmola et al., "Searchable Symmetric Encryption: Improved Definitions and Efficient Constructions," Journal of Computer Security, vol. 19, No. 5, 2011, pp. 1-33.

German Office Action for German Application No. 11 2018 007 433.1, dated Aug. 27, 2021, with English translation.

Yau et al., "Proxy Re-encryption with Keyword Search: New Definitions and Algorithms," Security Technology, Disaster Recovery and Business Continuity, 2010, pp. 149-160.

Zhang et al., "A Multi-users Searchable Encryption Scheme with Proxy Re-encryption," 2014 Tenth International Conference on Computational Intelligence and Security, IEEE, 2014, pp. 563-567.

Chinese Office Action and Search Report for Chinese Application No. 201880092550.7, dated Jul. 29, 2023, with an English translation.

* cited by examiner

Fig. 6

| ENCRYPTION KEYWORD | IDENTIFICATION INFORMATION |
|---|---|
| $V1 = H(e(H(W1), g)^{SK1})$ | id(D1) |
| $V2 = H(e(H(W2), g)^{SK1})$ | id(D1), id(D2) |
| ... | .. |

Fig. 7

| ENCRYPTION KEYWORD | IDENTIFICATION INFORMATION |
|---|---|
| $V3 = H(e(H(W2), g)^{SK2})$ | id(D3) |
| $V4 = H(e(H(W3), g)^{SK2})$ | id(D3) |
| ... | ... |

Fig. 15

| ENCRYPTION KEYWORD | IDENTIFICATION INFORMATION |
|---|---|
| V1=T{1, 0} | T{1, 1} |
| ... | ... |
| VL=T{L, 0} | T{L, 1} |

Fig. 16

| ENCRYPTION KEYWORD | IDENTIFICATION INFORMATION |
|---|---|
| V1=T{1, 0} | (0, 0, 0, 0, 0, 0, 1, 0, 1, 0) |
| ... | ... |
| VL=T{L, 0} | (1, 0, 0, 1, 1, 0, 0, 0, 0, 0) |

Fig. 20

| ATTRIBUTE SET | SEARCHER | PAIR OF ENCRYPTION KEY AND REGISTRATION KEY |
|---|---|---|
| S1 | Pa, Pb | EK1, SK1 |
| S2 | Pb | EK2, SK2 |
| ... | ... | ... |

Fig. 21

| SEARCHER | SEARCH KEY |
|---|---|
| Pa | Ka |
| Pb | Kb |
| ... | ... |

REGISTRATION DEVICE, SERVER DEVICE, SEARCHABLE ENCRYPTION SYSTEM, AND SEARCHABLE ENCRYPTION METHOD

CROSS-REFERENCE TO RELATED APPLICATION

This application is a Continuation of PCT International Application No. PCT/JP2018/017792 filed on May 8, 2018, which is hereby expressly incorporated by reference into the present application.

TECHNICAL FIELD

The present invention relates to a registration device, a server device, a searchable encryption system, a searchable encryption method, a registration program, and a server program.

BACKGROUND ART

Patent Literature 1, Patent Literature 2, and Patent Literature 3 disclose technology related to searchable encryption.

Searchable encryption is referred to as retrievable cryptograph as well. Searchable encryption is an encryption technology that allows search on encrypted data as it is. In practice, the encrypted data itself is not searched. A related keyword is extracted in advance from search-target data and encrypted with using a special encryption technology that can search for the keyword. Then, search is performed for the encryption keyword with using a search query. A search query is an encrypted keyword for search.

There are common-key scheme searchable encryption and public-key scheme searchable encryption. In the common-key scheme searchable encryption, common key cryptography technique is used, and registrants and searchers are limited. In the public-key scheme searchable encryption, public key cryptography technique is used. Although searchers are limited, registrants are not limited. A registrant is a user who registers encrypted data. A searcher is a user who searches for encrypted data.

There are tag-type searchable encryption and index-type searchable encryption. In the tag-type searchable encryption, a searchable encryption keyword is added to data which is a ciphertext. Since one ciphertext is tagged with a plurality of keywords, search speed is slow. In the index-type searchable encryption, each encryption keyword is associated with data which is a ciphertext. Since one keyword is tagged with a plurality of ciphertexts, search speed is high.

In recent years, searchable encryption has been gaining attention as a security technology in a cloud service for protecting confidential information from eavesdropping by a server administrator. A searchable encryption technology that can perform high-speed search and control access is sought for in order to apply the searchable encryption technology to various services.

With the common-key scheme, usually, high-speed searchable encryption can be performed, but access control cannot be performed. With the public-key scheme, usually, access control can be performed, but high-speed searchable encryption cannot be performed.

In the common-key scheme, usually, the registrant and the searcher share the same secret information with each other. Non-Patented Literature 1 discloses a common-key scheme in which the registrant and the searcher do not share the same secret information in order to reduce the cost needed for sharing the secret information and the degree of influence in case of secret information leakage.

Non-Patent Literature 1 also discloses a multi-user type shared-key scheme. In the multi-user type shared-key scheme, it is possible to set users who are allowed to search, and users who are not allowed to search. In other words, in the multi-user type shared-key scheme, it is possible to generate encrypted data that will be hit by one user's search but will not be hit by another user's search when a plurality of users with different secret information perform search using the same keyword.

CITATION LIST

Patent Literature

Patent Literature 1: JP 2010-061103 A
Patent Literature 2: JP 2016-012897 A
Patent Literature 3: JP 2017-037180 A

Non-Patent Literature

Non-Patent Literature 1: R. A. Popa, N. Zeldovich, "Multi-Key Searchable Encryption", IACR Cryptology ePrint Archive: Report 2013/508

SUMMARY OF INVENTION

Technical Problem

The technique described in Non-Patent Literature 1 achieves access control by using a plurality of keys. However, since the technique employs a tag-type scheme, its efficiency is low in spite of being a common-key based encryption.

The techniques described in Patent Literatures 1, 2 and 3 achieve access control by using a trusted third party, but have a low versatility because their tolerance toward the existence of a trusted third party is strongly dependent on each use case.

An objective of the present invention is to improve the speed and versatility of searchable encryption that can perform access control.

Solution to Problem

A registration device according to one aspect of the present invention includes:
  an index generation unit to generate an encryption keyword by encrypting a keyword corresponding to one ciphertext or more among a plurality of ciphertexts, with a registration key, and to generate an index including the generated encryption keyword and identification information which identifies the one ciphertext or more;
  a key generation unit to generate a conversion key to be used for proxy re-encryption by a server device, from the registration key and a search key which is used for encryption by a search device that generates a search query by encrypting a keyword to be used for search, the server device generating a re-encryption keyword by re-encrypting the search query and searching the index with the re-encryption keyword; and
  a registration unit to transmit the plurality of ciphertexts, the index generated by the index generation unit, and the conversion key generated by the key generation unit, to the server device.

A server device according to another aspect of the present invention includes:
- a first receiving unit to receive a plurality of ciphertexts, an index, and a conversion key which is to be used for proxy re-encryption, the index being generated by a registration device that generates an encryption keyword by encrypting a keyword corresponding to one ciphertext or more, with a registration key, the index including the encryption keyword and identification information which identifies the one ciphertext or more, the conversion key being generated by the registration device from the registration key and a search key which is used for encryption by a search device that generates a search query by encrypting a keyword to be used for search;
- a management unit to register, in a database, the plurality of ciphertexts, the index, and the conversion key which are received by the first receiving unit;
- a second receiving unit to receive the search query;
- a search unit to generate a re-encryption keyword by re-encrypting the search query received by the second receiving unit, with the conversion key registered by the management unit, to search the index registered by the management unit with the re-encryption keyword, to acquire, from the index, the identification information if the encryption keyword is obtained as a search result, and to extract a ciphertext identified by the identification information from the plurality of ciphertexts registered by the management unit; and
- a transmission unit to transmit the ciphertext extracted by the search unit to the search device.

Advantageous Effects of Invention

The present invention can achieve high-speed searchable encryption while achieving access control using plurality of keys, since it employs an index-type scheme. In addition, the present invention has a high versatility since it can employ most of common-key based index schemes.

BRIEF DESCRIPTION OF DRAWINGS

FIG. 6 is a table illustrating an example of an index according to Embodiment 1.

FIG. 7 is a table illustrating an example of the index according to Embodiment 1.

FIG. 15 is a table illustrating an example of the index according to Embodiment 1.

FIG. 16 is a table illustrating an example of the index according to Embodiment 1.

FIG. 20 is a table illustrating an example of data access right information, and of an encryption key and a registration key that correspond according to Embodiment 1.

FIG. 21 is a table illustrating an example of the search keys to be delivered to searchers according to Embodiment 1.

DESCRIPTION OF EMBODIMENTS

Figure 1:
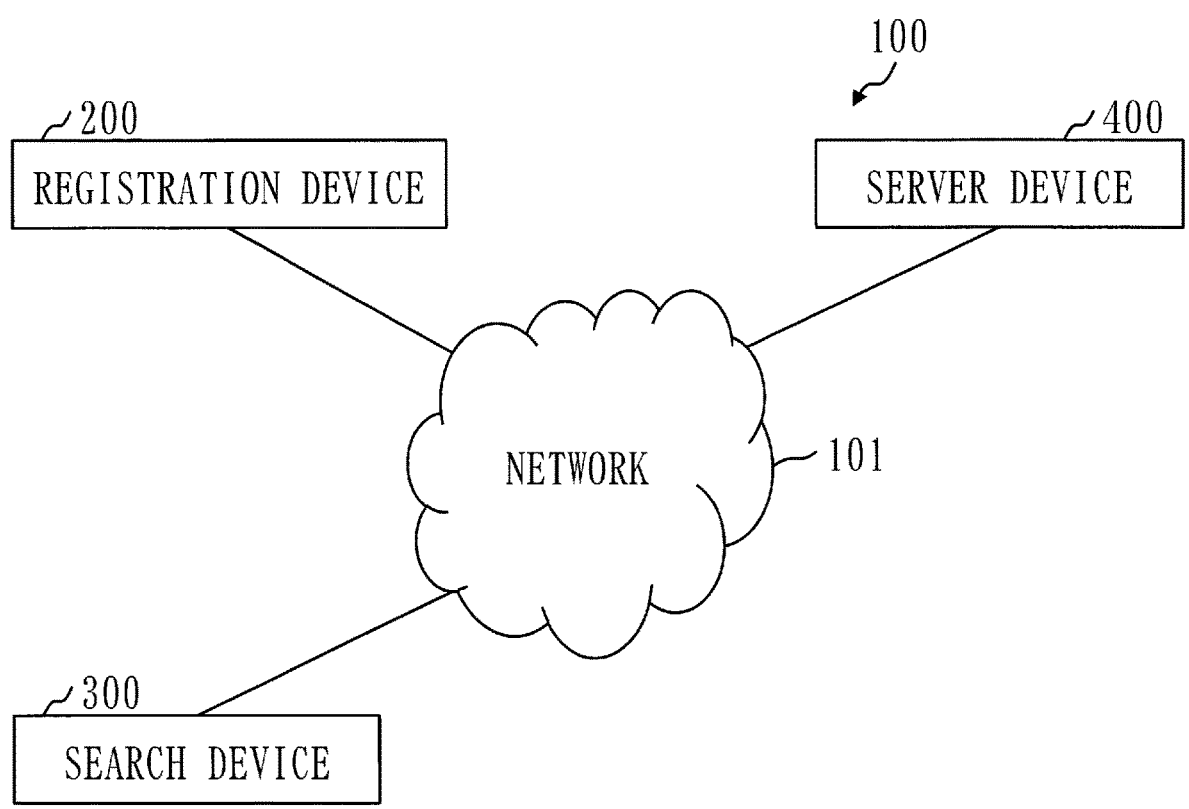
FIG. 1 is a block diagram illustrating a configuration of a searchable encryption system according to Embodiment 1.

An embodiment of the present invention will be described hereinafter with referring to drawings. In the drawings, the same or equivalent portions are denoted by the same reference numeral. In the description of the embodiment, explication of the same or equivalent portion will be appropriately omitted or simplified. The present invention is not limited to the embodiment described below, and various changes can be made to the present invention as necessary. For example, the embodiment described below may be practiced partly.

Embodiment 1

The present embodiment will be described with referring to FIGS. 1 to 16.

* Description of Configuration *

A configuration of a searchable encryption system 100 according to the present embodiment will be described with referring to FIG. 1.

The searchable encryption system 100 is provided with a registration device 200, a search device 300, and a server device 400.

The individual devices of the searchable encryption system 100 communicate with each other via a network 101 such as the Internet.

Figure 2:
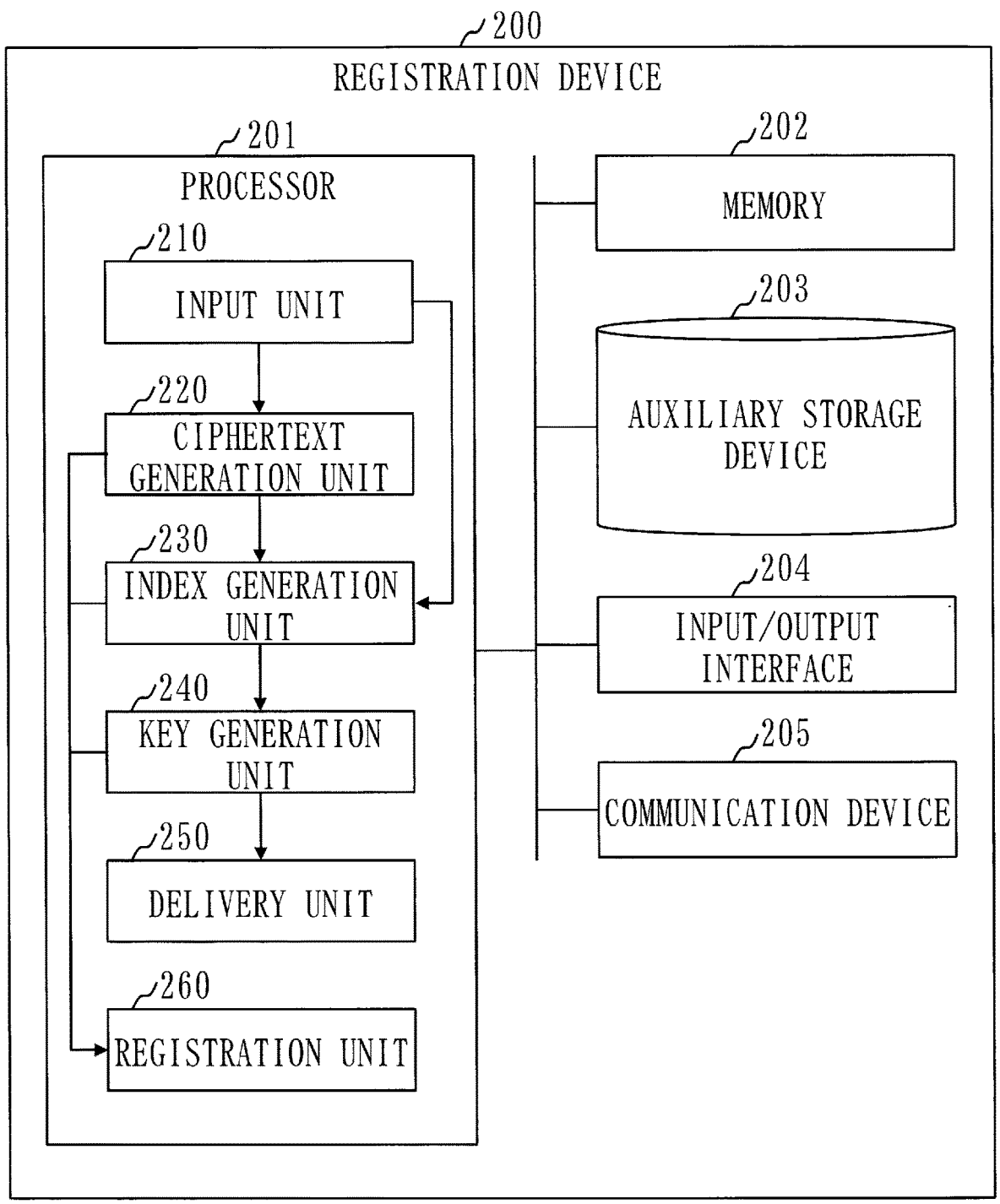
FIG. 2 is a block diagram illustrating a configuration of a registration device according to Embodiment 1.

A configuration of the registration device 200 according to the present embodiment will be described with referring to FIG. 2.

The registration device 200 is a computer. The registration device 200 is specifically a terminal such as a PC utilized by the registrant. Note that PC stands for Personal Computer. The registration device 200 is provided with a processor 201 and is also provided with other hardware devices such as a memory 202, an auxiliary storage device 203, an input/output interface 204, and a communication device 205. The processor 201 is connected to the other hardware devices via signal lines and controls these other hardware devices.

The registration device 200 is provided with an input unit 210, a ciphertext generation unit 220, an index generation unit 230, a key generation unit 240, a delivery unit 250, and a registration unit 260, as function elements. Functions of the input unit 210, ciphertext generation unit 220, index generation unit 230, key generation unit 240, delivery unit 250, and registration unit 260 are implemented by software.

Specifically, the functions of the input unit 210, ciphertext generation unit 220, index generation unit 230, key generation unit 240, delivery unit 250, and registration unit 260 are implemented by a registration program. The registration program is a program that causes the computer to execute a procedure performed by the input unit 210, a procedure performed by the ciphertext generation unit 220, a procedure performed by the index generation unit 230, a procedure performed by the key generation unit 240, a procedure performed by the delivery unit 250, and a procedure performed by the registration unit 260, respectively as an input procedure, a ciphertext generation procedure, an index generation procedure, a key generation procedure, a delivery procedure, and a registration procedure. The registration program may be recorded on a computer readable medium and provided in the form of the medium, may be stored in a recording medium and provided in the form of the recording medium, or may be provided as a program product.

The processor 201 is a device that executes the registration program. The processor 201 is, for example, a CPU. Note that CPU stands for Central Processing Unit.

The memory 202 is a device that stores the registration program temporarily. The memory 202 is, for example, a RAM or a flash memory, or a combination of a RAM and a flash memory. Note that RAM stands for Random-Access Memory.

The auxiliary storage device 203 is a device that stores the registration program in advance. The auxiliary storage device 203 is, for example, an HDD or a flash memory, or a combination of an HDD and a flash memory. Note that HDD stands for Hard Disk Drive.

The input/output interface 204 is a port to which an input apparatus and a display which are not illustrated are connected. The input/output interface 204 is, for example, a USB terminal. Note that USB stands for Universal Serial Bus. The input apparatus is an apparatus that is operated by a registrant for inputting data to the registration program. The input apparatus is, for example, a mouse, a keyboard, or a touch panel; or a combination of some or all of a mouse, a keyboard, and a touch panel. The display is an apparatus that displays data outputted from the registration program onto a screen. The display is, for example, an LCD. Note that LCD stands for Liquid Crystal Display.

The communication device 205 is provided with a receiver to receive data to be inputted to the registration program, and a transmitter to transmit data outputted from the registration program. The communication device 205 is, for example, a communication chip or an NIC. Note that NIC stands for Network Interface Card.

The registration program is loaded in the memory 202 from the auxiliary storage device 203, is read by the processor 201 from the memory 202, and is executed by the processor 201. Not only the registration program but also an OS is stored in the auxiliary storage device 203. Note that OS stands for Operating System. The processor 201 executes the registration program while executing the OS. The registration program may be partly or entirely incorporated in the OS. The registration program and the OS may be stored in the memory 202 in advance. In that case, the auxiliary storage device 203 can be omitted.

The registration device 200 may be provided with a plurality of processors that substitute for the processor 201. The plurality of processors share execution of the registration program. Each processor is, for example, a CPU.

Data, information, a signal value, and a variable value which are utilized, processed, or outputted by the registration program are stored in the auxiliary storage device 203, the memory 202, or a register or cache memory in the processor 201.

The registration device 200 may be constituted of one computer, or may be constituted of a plurality of computers. If the registration device 200 is constituted of a plurality of computers, the functions of the input unit 210, ciphertext generation unit 220, index generation unit 230, key generation unit 240, delivery unit 250, and registration unit 260 may be implemented by the individual computers through distribution.

Figure 3:
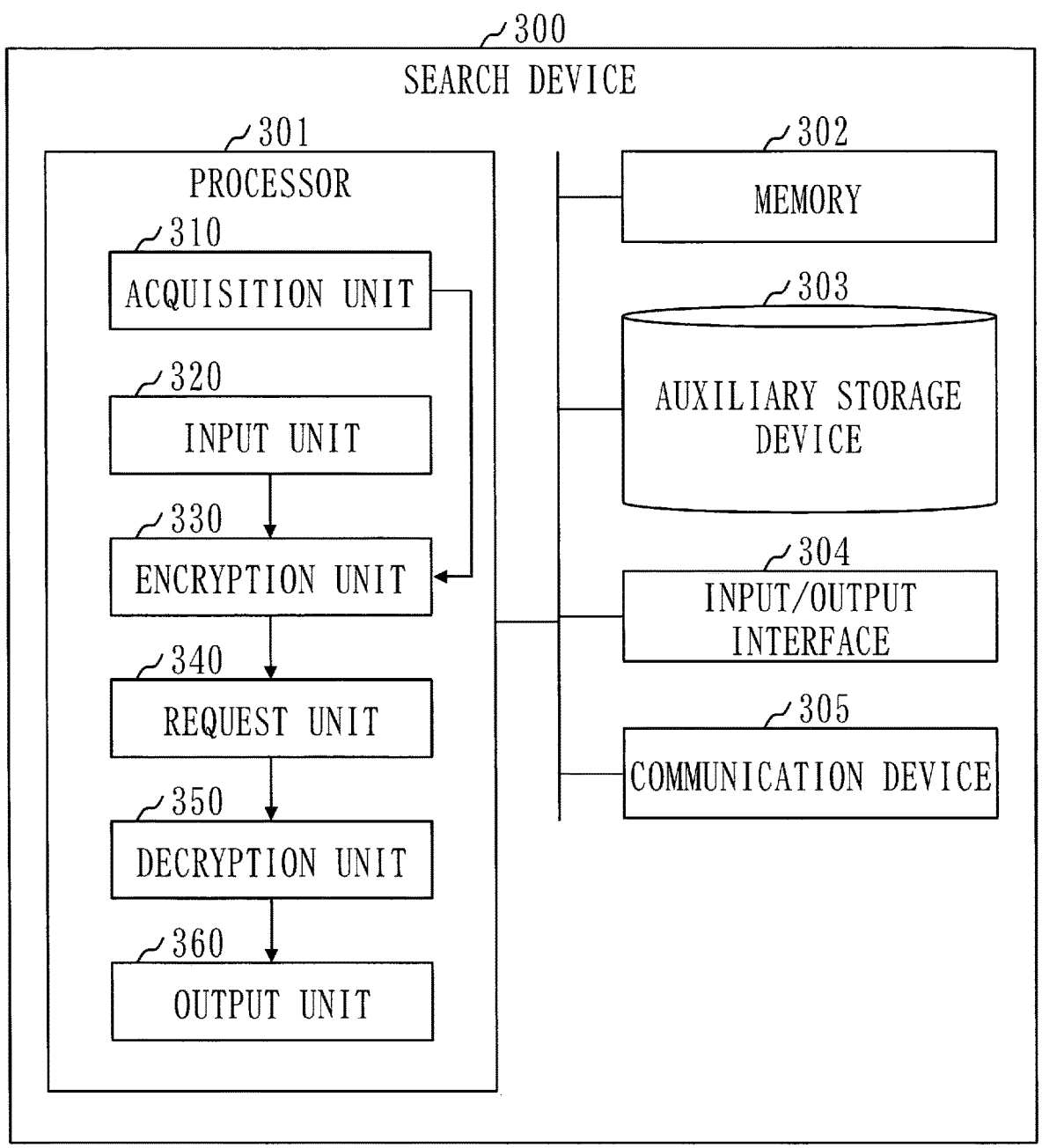
FIG. 3 is a block diagram illustrating a configuration of a search device according to Embodiment 1.

A configuration of the search device 300 according to the present embodiment will be described with referring to FIG. 3.

The search device 300 is a computer. The search device 300 is specifically a terminal such as a PC utilized by the searcher. The search device 300 is provided with a processor 301 and is also provided with other hardware devices such as a memory 302, an auxiliary storage device 303, an input/output interface 304, and a communication device 305. The processor 301 is connected to the other hardware devices via signal lines and controls these other hardware devices.

The search device 300 is provided with an acquisition unit 310, an input unit 320, an encryption unit 330, a request unit 340, a decryption unit 350, and an output unit 360, as function elements. Functions of the acquisition unit 310, input unit 320, encryption unit 330, request unit 340, decryption unit 350, and output unit 360 are implemented by software. Specifically, the functions of the acquisition unit 310, input unit 320, encryption unit 330, request unit 340, decryption unit 350, and output unit 360 are implemented by a search program. The search program is a program that causes the computer to execute a procedure performed by the acquisition unit 310, a procedure performed by the input unit 320, a procedure performed by the encryption unit 330, a procedure performed by the request unit 340, a procedure performed by the decryption unit 350, and a procedure performed by the output unit 360, respectively as an acquisition procedure, an input procedure, an encryption procedure, a request procedure, a decryption procedure, and an output procedure. The search program may be recorded on a computer readable medium and provided in the form of the medium, may be stored in a recording medium and provided in the form of the recording medium, or may be provided as a program product.

The processor 301 is a device that executes the search program. The processor 301 is, for example, a CPU.

The memory 302 is a device that stores the search program temporarily. The memory 302 is, for example, a RAM or a flash memory, or a combination of a RAM and a flash memory.

The auxiliary storage device 303 is a device that stores the search program in advance. The auxiliary storage device 303 is, for example, an HDD or a flash memory, or a combination of an HDD and a flash memory.

The input/output interface 304 is a port to which an input apparatus and a display which are not illustrated are connected. The input/output interface 304 is, for example, a USB terminal. The input apparatus is an apparatus that is operated by a searcher for inputting data to the search program. The input apparatus is, for example, a mouse, a keyboard, or a touch panel; or a combination of some or all of a mouse, a keyboard, and a touch panel. The display is an apparatus that displays data outputted from the search program onto a screen. The display is, for example, an LCD.

The communication device 305 is provided with a receiver to receive data to be inputted to the search program, and a transmitter to transmit data outputted from the search program. The communication device 305 is, for example, a communication chip or an NIC.

The search program is loaded in the memory 302 from the auxiliary storage device 303, is read by the processor 301 from the memory 302, and is executed by the processor 301. Not only the search program but also an OS is stored in the auxiliary storage device 303. The processor 301 executes the search program while executing the OS. The search program may be partly or entirely incorporated in the OS. The search program and the OS may be stored in the memory 302 in advance. In that case, the auxiliary storage device 303 can be omitted.

The search device 300 may be provided with a plurality of processors that substitute for the processor 301. The plurality of processors share execution of the search program. Each processor is, for example, a CPU.

Data, information, a signal value, and a variable value which are utilized, processed, or outputted by the search program are stored in the auxiliary storage device 303, the memory 302, or a register or cache memory in the processor 301.

The search device 300 may be constituted of one computer, or may be constituted of a plurality of computers. If the search device 300 is constituted of a plurality of computers, the functions of the acquisition unit 310. input unit 320, encryption unit 330, request unit 340, decryption unit 350, and output unit 360 may be implemented by the individual computers through distribution.

Figure 4:
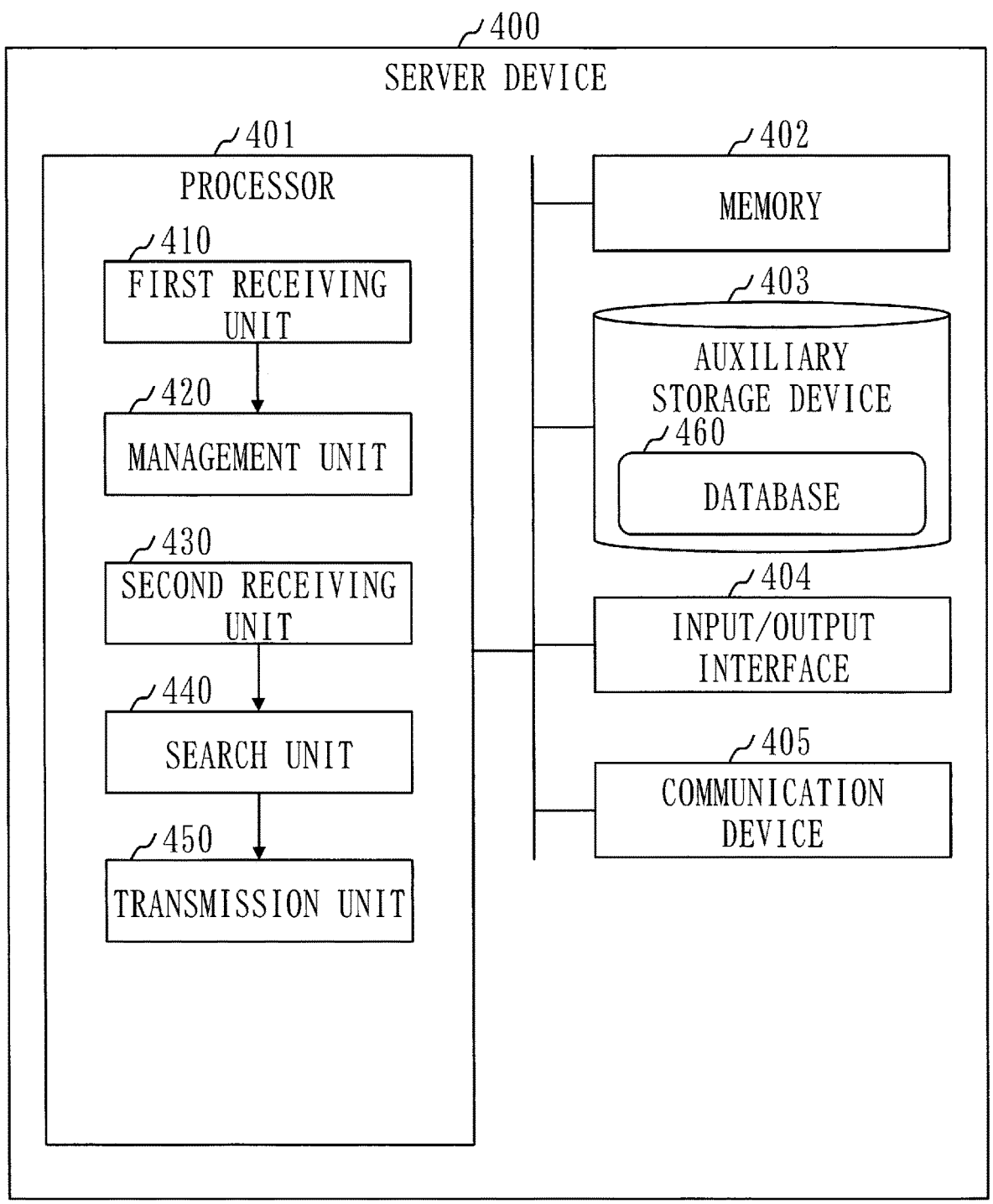
FIG. 4 is a block diagram illustrating a configuration of a server device according to Embodiment 1.

A configuration of the server device 400 according to the present embodiment will be described with referring to FIG. 4.

The server device 400 is a computer. The server device 400 is specifically a cloud server. The server device 400 is provided with a processor 401 and is also provided with other hardware devices such as a memory 402, an auxiliary storage device 403, an input/output interface 404, and a communication device 405. The processor 401 is connected to the other hardware devices via signal lines and controls these other hardware devices.

The server device 400 is provided with a first receiving unit 410, a management unit 420, a second receiving unit 430, a search unit 440, and a transmission unit 450, as function elements. Functions of the first receiving unit 410, management unit 420, second receiving unit 430, search unit 440, and transmission unit 450 are implemented by software. Specifically, the functions of the first receiving unit 410, management unit 420, second receiving unit 430, search unit 440, and transmission unit 450 are implemented by a server program. The server program is a program that causes the computer to execute a procedure performed by the first receiving unit 410, a procedure performed by the management unit 420, a procedure performed by the second receiving unit 430, a procedure performed by the search unit 440, and a procedure performed by the transmission unit 450, respectively as a first procedure, a management procedure, a second procedure, a search procedure, and a transmission procedure. The server program may be recorded on a computer readable medium and provided in the form of the medium, may be stored in a recording medium and provided in the form of the recording medium, or may be provided as a program product.

The processor 401 is a device that executes the server program. The processor 401 is, for example, a CPU.

The memory 402 is a device that stores the server program temporarily. The memory 402 is, for example, a RAM or a flash memory, or a combination of a RAM and a flash memory.

The auxiliary storage device 403 is a device that stores the server program in advance. The auxiliary storage device 403 is, for example, an HDD or a flash memory, or a combination of an HDD and a flash memory.

A database 460 is constructed in the auxiliary storage device 403. Alternatively, the database 460 may be constructed in the memory 402.

The input/output interface 404 is a port to which an input apparatus and a display which are not illustrated are connected. The input/output interface 404 is, for example, a USB terminal. The input apparatus is an apparatus that is operated by a server administrator for inputting data to the server program. The input apparatus is, for example, a mouse, a keyboard, or a touch panel; or a combination of some or all of a mouse, a keyboard, and a touch panel. The display is an apparatus that displays data outputted from the server program onto a screen. The display is, for example, an LCD.

The communication device 405 is provided with a receiver to receive data to be inputted to the server program, and a transmitter to transmit data outputted from the server program. The communication device 405 is, for example, a communication chip or an NIC.

The server program is loaded in the memory 402 from the auxiliary storage device 403, is read by the processor 401 from the memory 402, and is executed by the processor 401. Not only the server program but also an OS is stored in the auxiliary storage device 403. The processor 401 executes the server program while executing the OS. The server program may be partly or entirely incorporated in the OS. The server program and the OS may be stored in the memory 402 in advance. In that case, the auxiliary storage device 403 can be omitted.

The server device 400 may be provided with a plurality of processors that substitute for the processor 401. The plurality of processors share execution of the server program. Each processor is, for example, a CPU.

Data, information, a signal value, and a variable value which are utilized, processed, or outputted by the server program are stored in the auxiliary storage device 403, the memory 402, or a register or cache memory in the processor 401.

The server device 400 may be constituted of one computer, or may be constituted of a plurality of computers. If the server device 400 is constituted of a plurality of computers, the functions of the first receiving unit 410, management unit 420, second receiving unit 430, search unit 440, and transmission unit 450 may be implemented by the individual computers through distribution.

* Description of Operations *

Operations of the searchable encryption system 100 according to the present embodiment will be described with referring to FIGS. 5 to 14. The operations of the searchable encryption system 100 correspond to a searchable encryption method according to the present embodiment.

Figure 5:
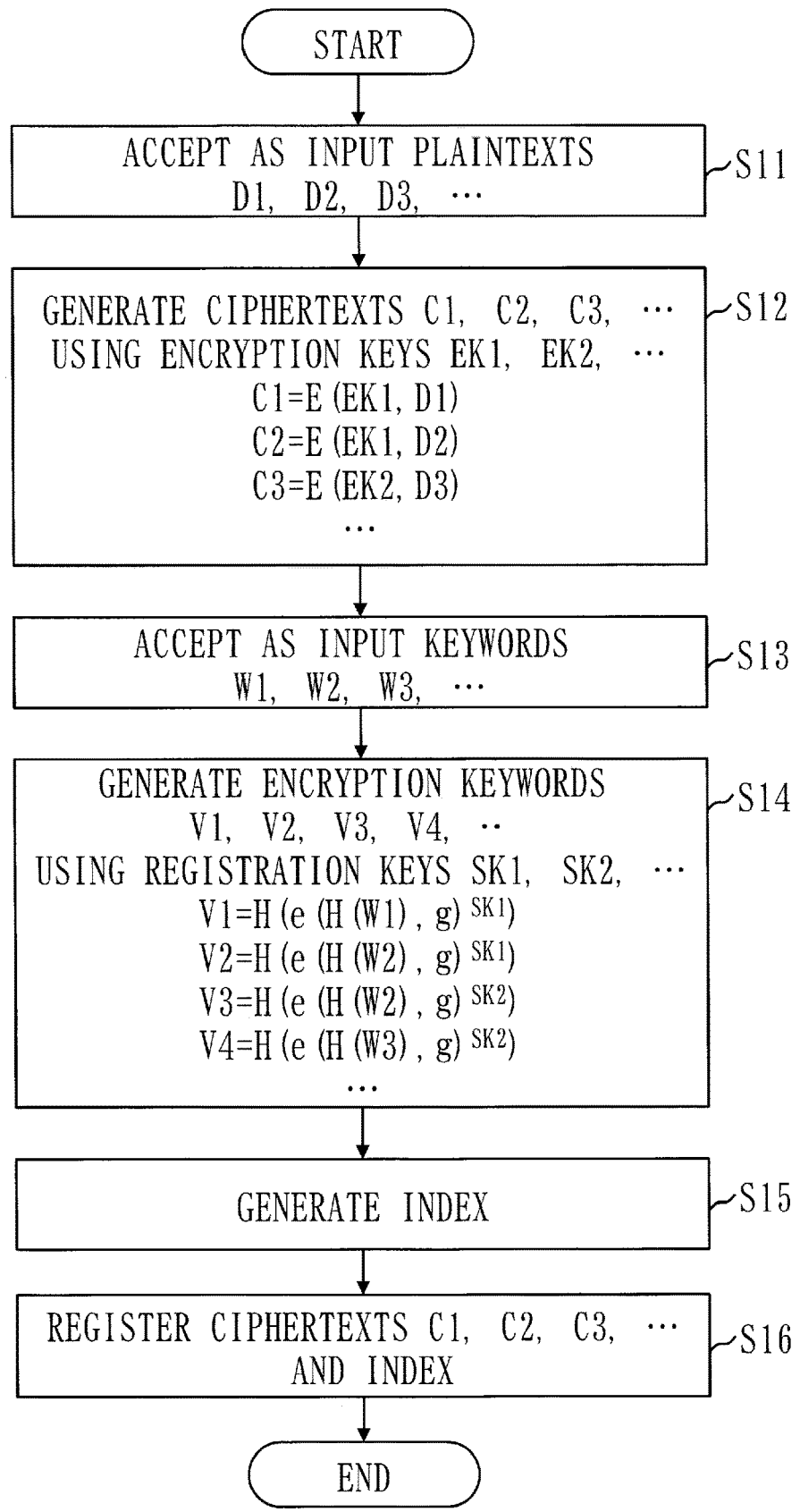
FIG. 5 is a flowchart illustrating operations of the registration device according to Embodiment 1.

FIG. 5 illustrates operations of how the registration device 200 registers a plurality of ciphertexts and an index in the server device 400.

In step S11, the input unit 210 accepts as input a plurality of plaintexts. Specifically, the input unit 210 accepts as input plaintexts D1, D2, D3, . . . via the input/output interface 204. In the present embodiment, the input unit 210 also accepts as input attribute sets S1, S2, . . . , indicating which searcher is allowed to access which plaintext.

In step S12, the ciphertext generation unit 220 generates a plurality of ciphertexts by encrypting the plurality of plaintexts inputted to the input unit 210, with encryption keys. Specifically, the ciphertext generation unit 220 encrypts the plaintext D1 with an encryption key EK1, and writes data obtained by the encryption to the memory 202 as a ciphertext C1. The ciphertext generation unit 220 encrypts the plaintext D2 with the encryption key EK1, and writes data obtained by the encryption to the memory 202 as a ciphertext C2. The ciphertext generation unit 220 encrypts the plaintext D3 with an encryption key EK2, and writes data obtained by the encryption to the memory 202 as a ciphertext C3. Each encryption key is stored in the auxiliary storage device 203 in advance, or is inputted to the auxiliary storage device 203 as necessary via the input/output interface 204. As to which encryption key is used for encryption of which plaintext, it is specified in advance, or is specified at the time of plaintext inputting or encryption key inputting. In the present embodiment, which encryption key is used for encryption of which plaintext is decided by the attribute set inputted in step S11.

In step S13, the input unit 210 accepts as input a keyword corresponding to one plaintext or more among the plurality of plaintexts inputted to the input unit 210. That is, the input unit 210 accepts as input a keyword corresponding to one ciphertext or more among the plurality of ciphertexts inputted to the input unit 210. Specifically, the input unit 210 accepts as input keywords W1, W2, W3, . . . , via the input/output interface 204. The keyword W1 corresponds to the plaintext D1. That is, the keyword W1 corresponds to the ciphertext C1. The keyword W2 corresponds to the plaintext D1 and the plaintext D2. That is, the keyword W2 corresponds to the ciphertext C1 and the ciphertext C2. The keyword W3 corresponds to the plaintext D3. That is, the keyword W3 corresponds to the ciphertext C3. Each keyword may be set for the plaintext manually, or may be extracted from the plaintext automatically.

In step S14, the index generation unit 230 generates an encryption keyword by encrypting a keyword inputted to the input unit 210, with a registration key. Specifically, the index generation unit 230 supplies a hash value of the keyword W1 and a predetermined value g to a pairing function e, raises a value obtained by the pairing function e, as base, to the power of registration key SK1, as exponent, and writes a calculation result to the memory 202, as an encryption keyword V1. The index generation unit 230 supplies a hash value of the keyword W2 and the value g to the pairing function e, raises a value obtained by the pairing function e, as base, to the power of the registration key SK1, as exponent, and writes a calculation result to the memory 202, as an encryption keyword V2. The index generation unit 230 supplies the hash value of the keyword W2 and the value g to the pairing function e, raises a value obtained by the pairing function e, as base, to the power of a registration key SK2, as exponent, and writes a calculation result to the memory 202, as an encryption keyword V3. The index generation unit 230 supplies a hash value of the keyword W3 and the value g to the pairing function e, raises a value obtained by the pairing function e, as base, to the power of the registration key SK2, as exponent, and writes a calculation result in the memory 202, as an encryption keyword V4. Each registration key is paired with an encryption key, and is stored in the auxiliary storage device 203 in advance or is inputted to the auxiliary storage device 203 as necessary via the input/output interface 204, just as each encryption key is. As to which registration key is to be used for encryption of which keyword, it is decided in accordance with which encryption key a plaintext corresponding to the keyword has been encrypted with.

FIG. 20 illustrates an example of data access right information, and of an encryption key and a registration key that correspond. In this example, the plaintext D1 and the plaintext D2 correspond to the attribute set S1, and the plaintext D3 corresponds to the attribute set S2. That is, access to the plaintext D1 and the plaintext D2 is allowed to a searcher Pa and searcher Pb belonging to the attribute set S1, and access to the plaintext D3 is allowed only to a searcher Pb belonging to the attribute set S2. In step S12, a pair of the encryption key EK1 and the registration key SK1 is generated as a pair of an encryption key and a registration key that correspond to the attribute set S1, and a pair of the encryption key EK2 and the registration key SK2 is generated as a pair of an encryption key and a registration key that correspond to the attribute set S2. The pair of the encryption key EK1 and the registration key SK1 is stored to be associated with the attribute set S1. The pair of the encryption key EK2 and the registration key SK2 is stored to be associated with the attribute set S2. If a pair of an encryption key and a registration key is already registered with using the same attribute set, the stored encryption key and registration key are read out instead of generating a pair of an encryption key and a registration key.

In step S15, the index generation unit 230 generates an index including an encryption keyword which is generated in step S14 and identification information which identifies one corresponding ciphertext or more. Specifically, the index generation unit 230 generates an index including a combination of the encryption keyword V1 and an identifier of the plaintext D1, as one entry, and including a combination of the encryption keyword V2 and identifiers of the plaintext D1 and plaintext D2, as another entry, as illustrated in FIG. 6. The index generation unit 230 generates an index including a combination of the encryption keyword V3 and an identifier of the plaintext D3, as one entry, and including a combination of the encryption keyword V4 and an identifier of the plaintext D3, as another entry, as illustrated in FIG. 7. It may be possible to employ structures of the indexes illustrated in FIGS. 6 and 7 as they are. To ensure security against frequency analysis, it is preferable to employ indexes as illustrated in FIGS. 15 and 16, which will be described later.

Figure 14:
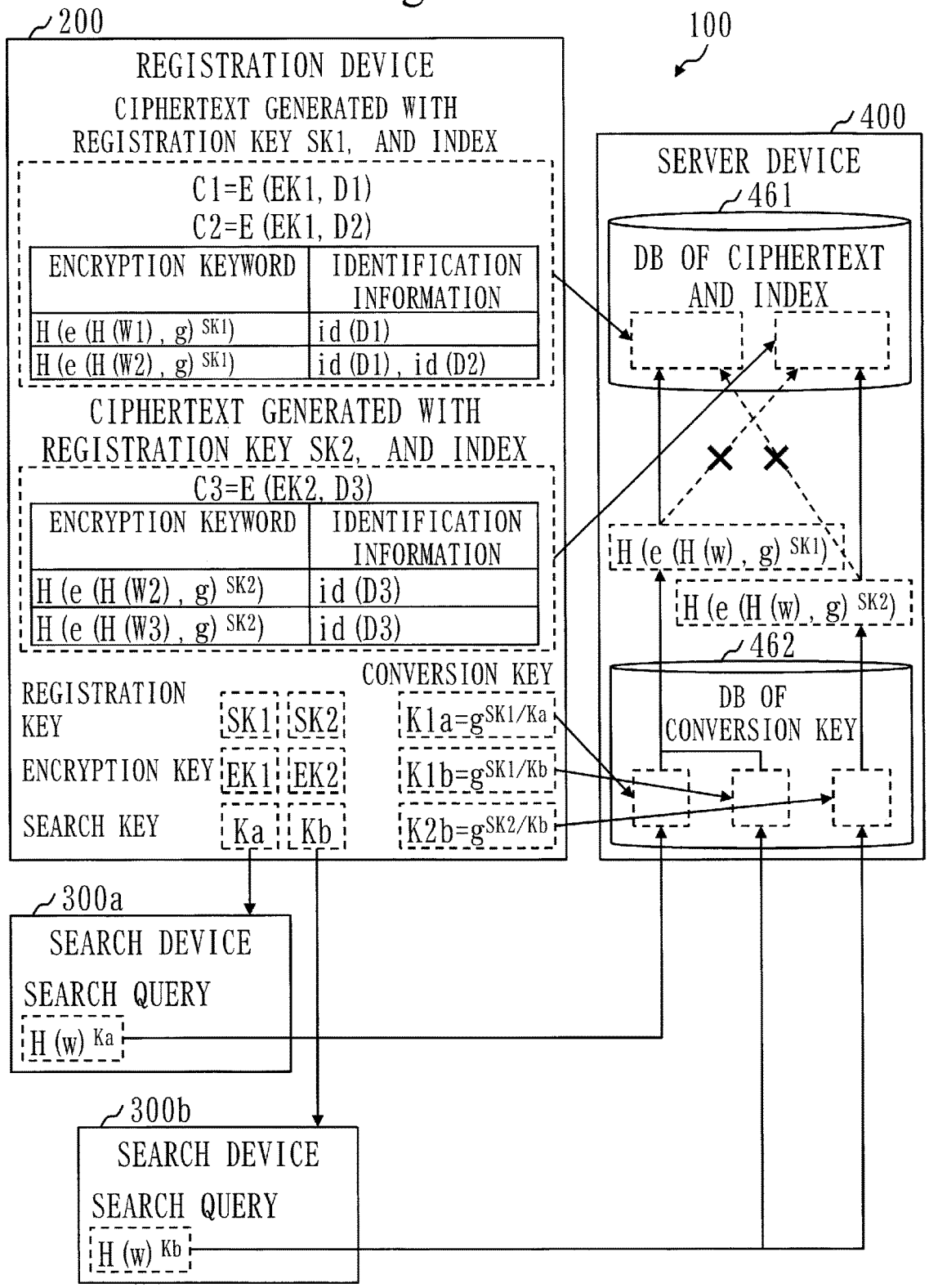
FIG. 14 is a diagram illustrating data flow of the searchable encryption system according to Embodiment 1.

In step S16, the registration unit 260 transmits the plurality of ciphertexts generated by the ciphertext generation unit 220 and the index generated by the index generation unit 230 to the server device 400. Specifically, as illustrated in FIG. 14, the registration unit 260 transmits the ciphertext C1 and ciphertext C2, and the index of FIG. 6 together to the server device 400. The registration unit 260 transmits the ciphertext C3, and the index of FIG. 7 together to the server device 400.

Figure 8:
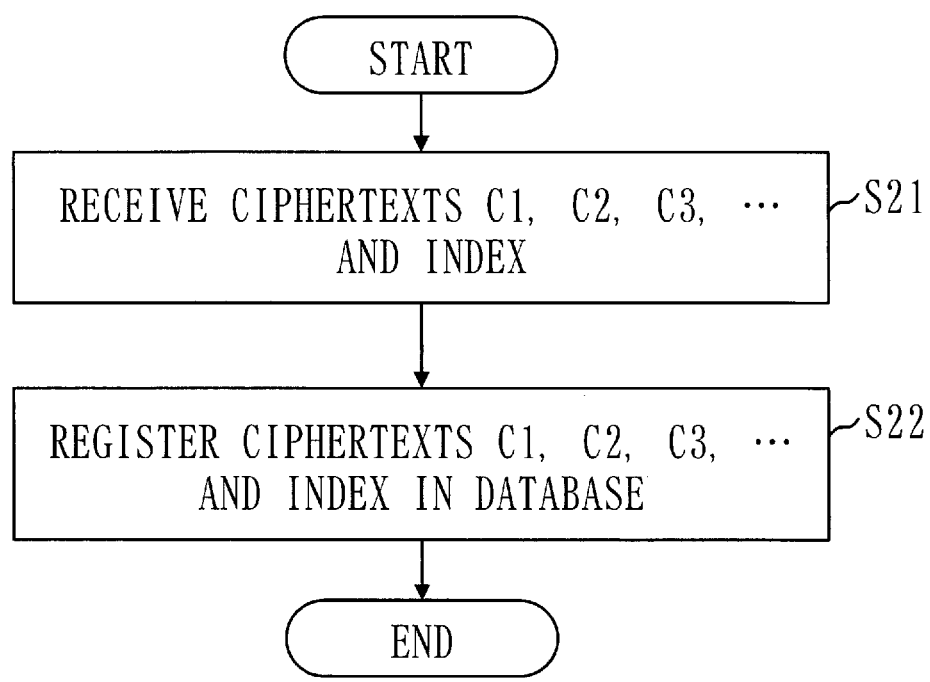
FIG. 8 is a flowchart illustrating operations of the server device according to Embodiment 1.

FIG. 8 illustrates operations of how the server device 400 registers a plurality of ciphertexts and an index in the database 460.

In step S21, the first receiving unit 410 receives the plurality of ciphertexts and the index transmitted from the registration device 200. Specifically, as illustrated in FIG. 14, the first receiving unit 410 receives the ciphertext C1 and the ciphertext C2, and the index of FIG. 6, together from the registration device 200. The first receiving unit 410 receives the ciphertext C3 and the index of FIG. 7, together from the registration device 200.

In step S22, the management unit 420 registers the plurality of ciphertexts and the index received by the first receiving unit 410, in the database 460. Specifically, as illustrated in FIG. 14, the management unit 420 registers the ciphertext C1 and the ciphertext C2, and the index of FIG. 6, together in a database 461. The management unit 420 registers the ciphertext C3 and the index of FIG. 7, together in the database 461. Preferably, the database 460 is separated into the database 461 for ciphertexts and indexes, and a database 462 for conversion keys to be described later, as in the present embodiment. However, databases may be integrated as one database.

Figure 9:
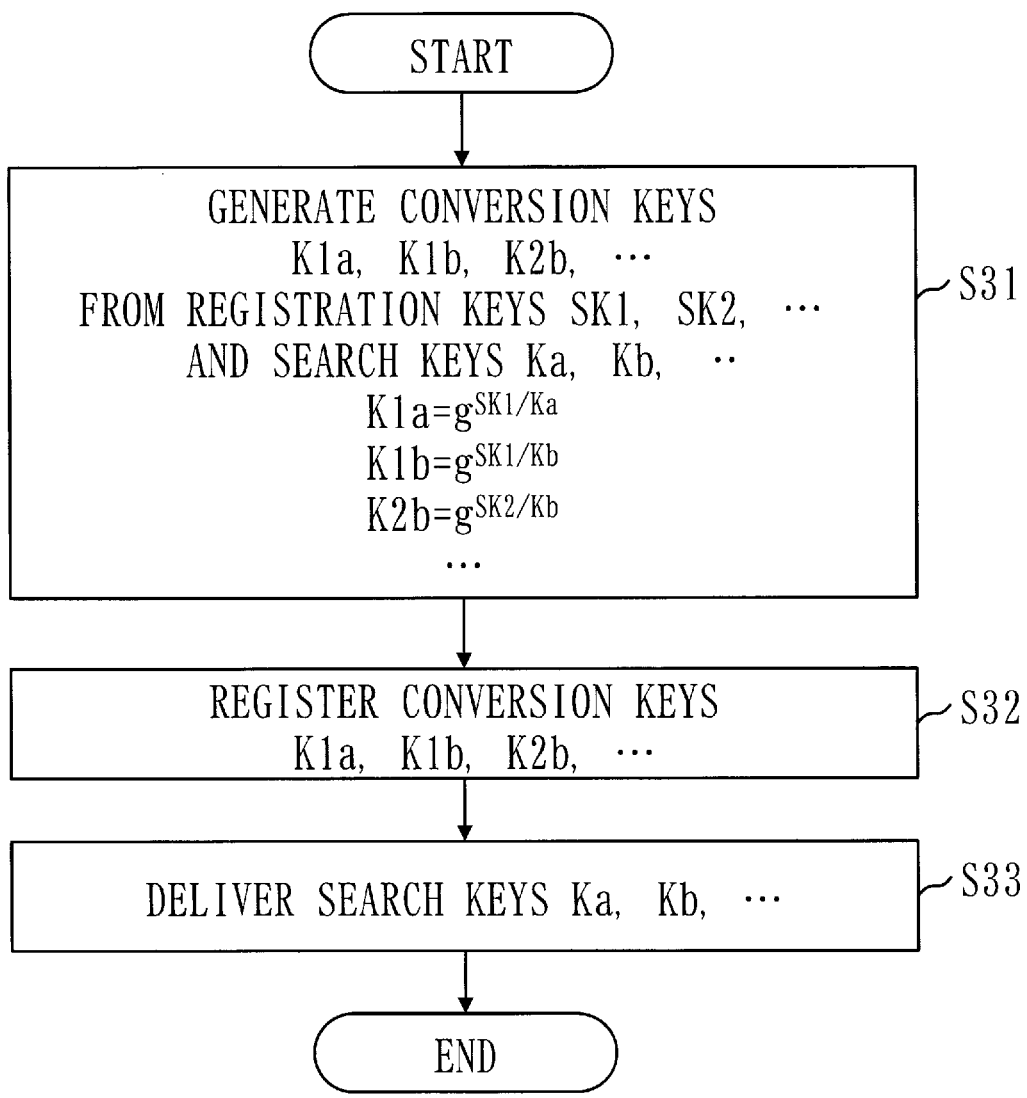
FIG. 9 is a flowchart illustrating operations of the registration device according to Embodiment 1.

FIG. 9 illustrates operations of how the registration device 200 registers the conversion key in the server device 400 and delivers the search key to the search device 300.

In step S31, the key generation unit 240 generates a conversion key to be used by the server device 400 for proxy re-encryption, from a registration key and a search key which is used by the search device 300 for encryption. Specifically, the key generation unit 240 raises the value g described above, as a base, to the power of a value obtained by dividing the registration key SK1 by a search key Ka, as exponent, and writes a calculation result in the memory 202, as a conversion key K1a. The key generation unit 240 raises the value g, as base, to the power of a value obtained by dividing the registration key SK1 by a search key Kb, as exponent, and writes a calculation result in the memory 202, as a conversion key K1b. The key generation unit 240 raises the value g, as base, to the power of a value obtained by dividing the registration key SK2 by the search key Kb, as exponent, and writes a calculation result in the memory 202, as a conversion key K2b. Each search key is stored in the auxiliary storage device 203 in advance or is inputted to the auxiliary storage device 203 as necessary via the input/output interface 204. As to which search key is to be paired with which registration key, it is specified in advance, or is specified at the time of registration key inputting or search key inputting. If a conversion key generated from a combination of a certain registration key and a certain search key is used, a key having been encrypted with that search key can be converted, without decryption, into a keyword having been encrypted with that registration key. In the example of FIG. 20, an index generated by the registration key SK1 allows search by the searcher Pa and searcher Pb included in the attribute set S1. Hence, the conversion key K1a and the conversion key K1b that correspond to the searcher Pa and the searcher Pb, respectively, are generated to enable search with the search key Ka to be delivered to the searcher Pa and search with the search key Kb to be delivered to the searcher Pb, respectively. The index generated with using the registration key SK2 allows search by only the searcher Pb included in the attribute set S2. Hence, a conversion key K2b corresponding to the search key Kb is generated to enable search with the search key Kb to be delivered to the searcher Pb.

In step S32, the registration unit 260 transmits the conversion key generated by the key generation unit 240, to the server device 400. Specifically, the registration unit 260 transmits the conversion keys K1a, K1b, K2b, . . . to the server device 400, as illustrated in FIG. 14.

In step S33, the delivery unit 250 transmits the search key used for generation of the conversion key by the key generation unit 240, to the search device 300. Specifically, as illustrated in FIG. 14, the delivery unit 250 transmits the search key Ka to a search device 300a, being the search device 300 of the searcher Pa. The delivery unit 250 transmits the search key Kb to a search device 300b, being the search device 300 of the searcher Pb. FIG. 21 illustrates an example of the search keys to be delivered to searchers. In this example, the search key Ka is delivered to the searcher Pa, and the search key Kb is delivered to the searcher Pb. In this manner, the search key differs according to the searcher.

A process of step S33 may be performed prior to a process of step S31.

Figure 10:
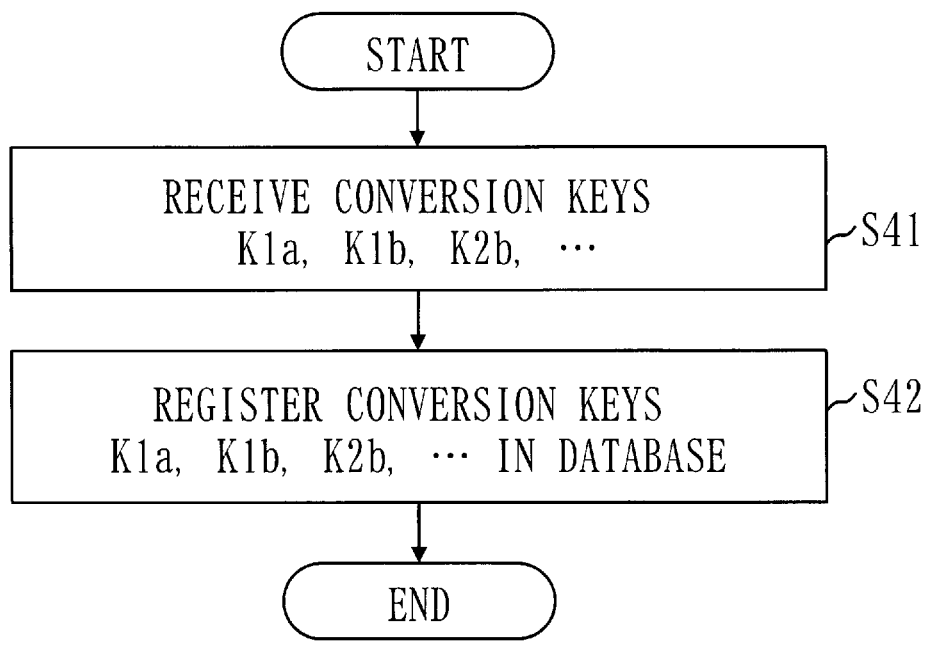
FIG. 10 is a flowchart illustrating operations of the server device according to Embodiment 1.

FIG. 10 illustrates operations of how the server device 400 registers the conversion key in the database 460.

In step S41, the first receiving unit 410 receives the conversion key transmitted from the registration device 200. Specifically, the first receiving unit 410 receives the conversion keys K1a, K1b, K2b, . . . from the registration device 200, as illustrated in FIG. 14.

In step S42, the management unit 420 registers the conversion key received by the first receiving unit 410, in the database 460. Specifically, the management unit 420 registers the conversion keys K1a, K1b, K2b, . . . in the database 462, as illustrated in FIG. 14. As described above, in the present embodiment, the database 460 is separated into the database 461 for the ciphertexts and indexes and the database 462 for the conversion keys.

Figure 11:
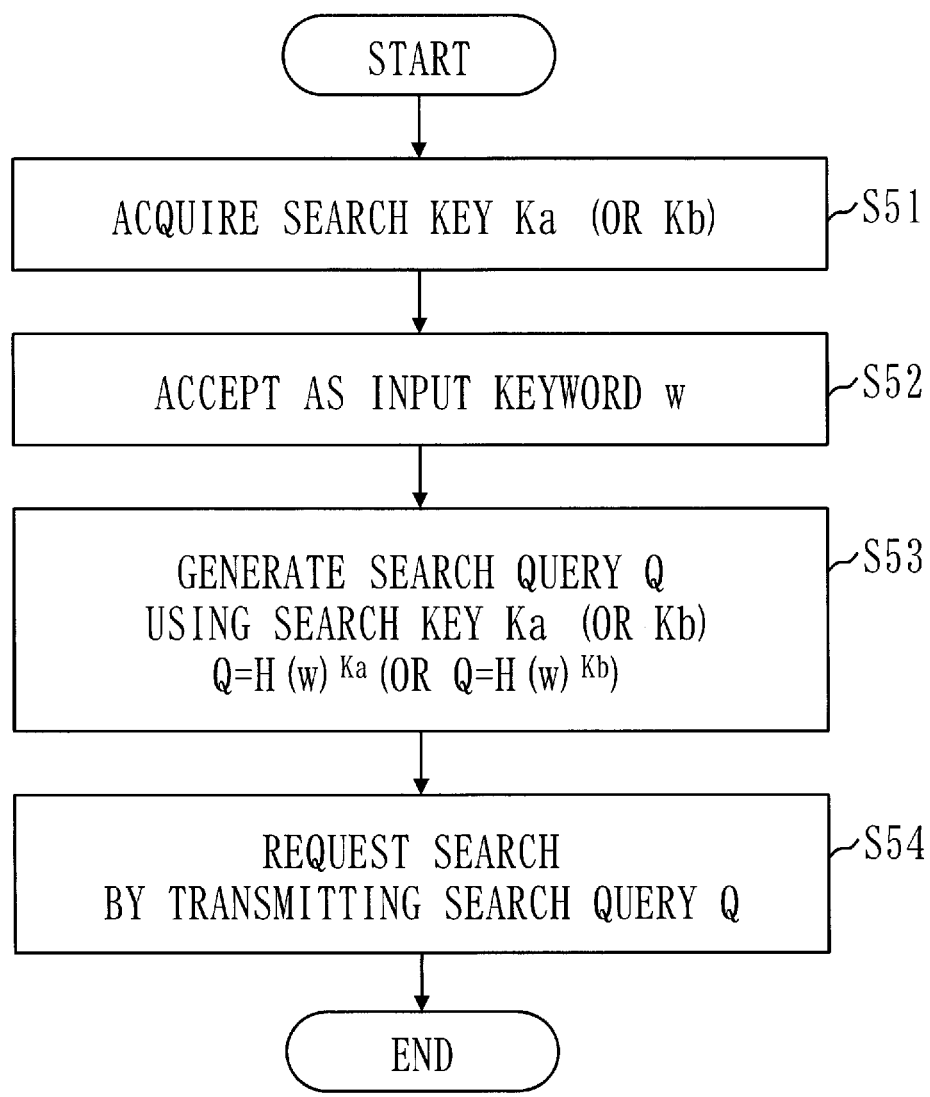
FIG. 11 is a flowchart illustrating operations of the search device according to Embodiment 1.

FIG. 11 illustrates operations of how the search device 300 requests search by sending a search query to the server device 400.

In step S51, the acquisition unit 310 receives the search key transmitted from the registration device 200. Specifically, as illustrated in FIG. 14, the acquisition unit 310 of the search device 300a receives the search key Ka from the registration device 200. Alternatively, the acquisition unit 310 of the search device 300b receives the search key Kb from the registration device 200.

In step S52, the input unit 320 accepts as input a keyword to be used for search. Specifically, the input unit 320 accepts as input a keyword w via the input/output interface 304 or the communication device 305.

In step S53, the encryption unit 330 generates a search query by encrypting the keyword inputted to the input unit 320, with the search key received by the acquisition unit 310. Specifically, the encryption unit 330 of the search device 300a raises a hash value of the keyword w, as base, to the power of the search key Ka, as exponent, and writes a calculation result in the memory 302, as a search query Q. Alternatively, the encryption unit 330 of the search device 300b raises a hash value of the keyword w, as base, to the power of the search key Kb, as exponent, and writes a calculation result in the memory 302, as a search query Q.

In step S54, the request unit 340 requests search by transmitting the search query generated by the encryption unit 330 to the server device 400. Specifically, the request unit 340 of the search device 300a or search device 300b transmits the search query Q to the server device 400, as illustrated in FIG. 14.

Figure 12:
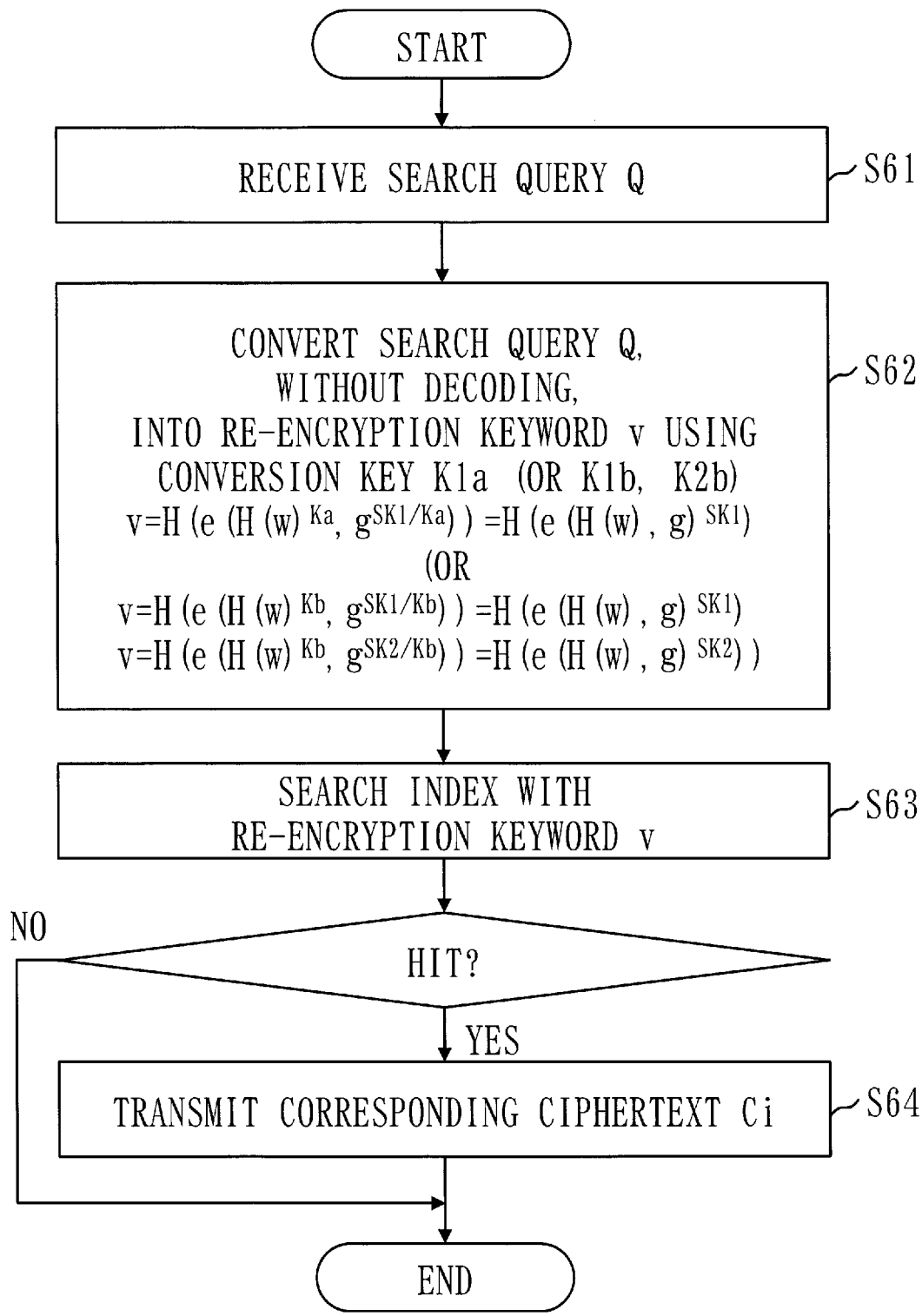
FIG. 12 is a flowchart illustrating operations of the server device according to Embodiment 1.

FIG. 12 illustrates operations of how the server device 400 performs search.

In step S61, the second receiving unit 430 receives the search query transmitted from the search device 300. Specifically, the second receiving unit 430 receives the search query Q from the search device 300a or search device 300b, as illustrated in FIG. 14.

In step S62, the search unit 440 generates a re-encryption keyword by re-encrypting the search query received by the second receiving unit 430, with the conversion key registered by the management unit 420. Specifically, as illustrated in FIG. 14, the search unit 440 re-encrypts the search query Q transmitted from the search device 300a or search device 300b with the conversion keys K1a, K1b, K2b, . . . registered in the database 462, and writes data obtained by the proxy re-encryption in the memory 402 as a re-encryption keyword v. In the case of the conversion key K1a, the proxy re-encryption is performed by supplying the search query Q and the conversion key K1a to the pairing function e and calculating a hash value of a value obtained by the pairing function e. In the case of the conversion key K1b, the proxy re-encryption is performed by supplying the search query Q and the conversion key K1b to the pairing function e and calculating a hash value of a value obtained by the pairing function e. In the case of the conversion key K2b, the proxy re-encryption is performed by supplying the search query Q and the conversion key K2b to the pairing function e and calculating a hash value of a value obtained by the pairing function e.

In step S63, the search unit 440 searches the index registered by the management unit 420, with the re-encryption keyword generated in step S62. Specifically, as illustrated in FIG. 14, the search unit 440 extracts an entry that includes an encryption keyword matching with the re-encryption keyword v, from the index of FIG. 6 registered in the database 461. The search unit 440 extracts an entry that includes an encryption keyword matching with the re-encryption keyword v, from the index of FIG. 7 registered in the database 461.

If an encryption keyword is not obtained as a search result, the search operations are ended. If an encryption keyword is obtained as a search result, a process of step S64 is performed. In a case where the re-encryption keyword v matches with the encryption keyword V1, an entry that includes the encryption keyword V1 as the search result is extracted from the index of FIG. 6. In a case where the re-encryption keyword v matches with the encryption keyword V2, an entry that includes the encryption keyword V2 as the search result is extracted from the index of FIG. 6. In a case where the re-encryption keyword v matches with the encryption keyword V3, an entry that includes the encryption keyword V3 as the search result is extracted from the index of FIG. 7. In a case where the re-encryption keyword v matches with the encryption keyword V4, an entry that includes the encryption keyword V4 as the search result is extracted from the index of FIG. 7.

In step S64, the search unit 440 acquires the identification information from the index including, as the search result, the encryption keyword obtained in step S63. Then, the search unit 440 extracts a ciphertext identified by the acquired identification information from the plurality of ciphertexts registered by the management unit 420. Specifically, as illustrated in FIG. 14, in a case where an entry that includes the encryption keyword V1 is extracted as the search result, since the entry includes the identifier of the plaintext D1, the search unit 440 extracts the ciphertext C1 registered in the database 461. In a case where an entry that includes the encryption keyword V2 is extracted as the search result, since the entry includes the identifier of the plaintext D1 and the identifier of the plaintext D2, the search unit 440 extracts the ciphertext C1 and ciphertext C2 registered in the database 461. In a case where an entry that includes the encryption keyword V3 is extracted as the search result, since the entry includes the identifier of the plaintext D3, the search unit 440 extracts the ciphertext C3 registered in the database 461. In a case where an entry that includes the encryption keyword V4 is extracted as the search result, since the entry includes the identifier of the plaintext D3, the search unit 440 extracts the ciphertext C3 registered in the database 461.

The transmission unit 450 transmits the ciphertext extracted by the search unit 440 to the search device 300. Specifically, as illustrated in FIG. 14, in a case where the keyword w matches with the keyword W1, since the ciphertext C1 is extracted, as a result of search, for the search query Q transmitted from the search device 300a, the transmission unit 450 transmits the ciphertext C1 to the search device 300a. In a case where the keyword w matches with the keyword W2, since the ciphertexts C1 and ciphertext C2 are extracted, as a result of search, for the search query Q transmitted from the search device 300a, the transmission unit 450 transmits the ciphertext C1 and ciphertext C2 to the search device 300a. In a case where the keyword w matches with the keyword W3, since a ciphertext is not extracted, as a result of search, for the search query Q transmitted from the search device 300a, the transmission unit 450 does not transmit a ciphertext to the search device 300a. Alternatively, in a case where the keyword w matches with the keyword W1, since the ciphertext C1 is extracted, as a result of search, for the search query Q transmitted from the search device 300b, the transmission unit 450 transmits the ciphertext C1 to the search device 300b. In a case where the keyword w matches with the keyword W2, since the ciphertext C1 and ciphertext C2 are extracted, as a result of search, for the search query Q transmitted from the search device 300b, the transmission unit 450 transmits the ciphertext C1 and ciphertext C2 to the search device 300b. In a case where the keyword w matches with the keyword W3, since the ciphertext C3 is extracted, as a result of search, for the search query Q transmitted from the search device 300b, the transmission unit 450 transmits the ciphertext C3 to the search device 300b.

Figure 13:
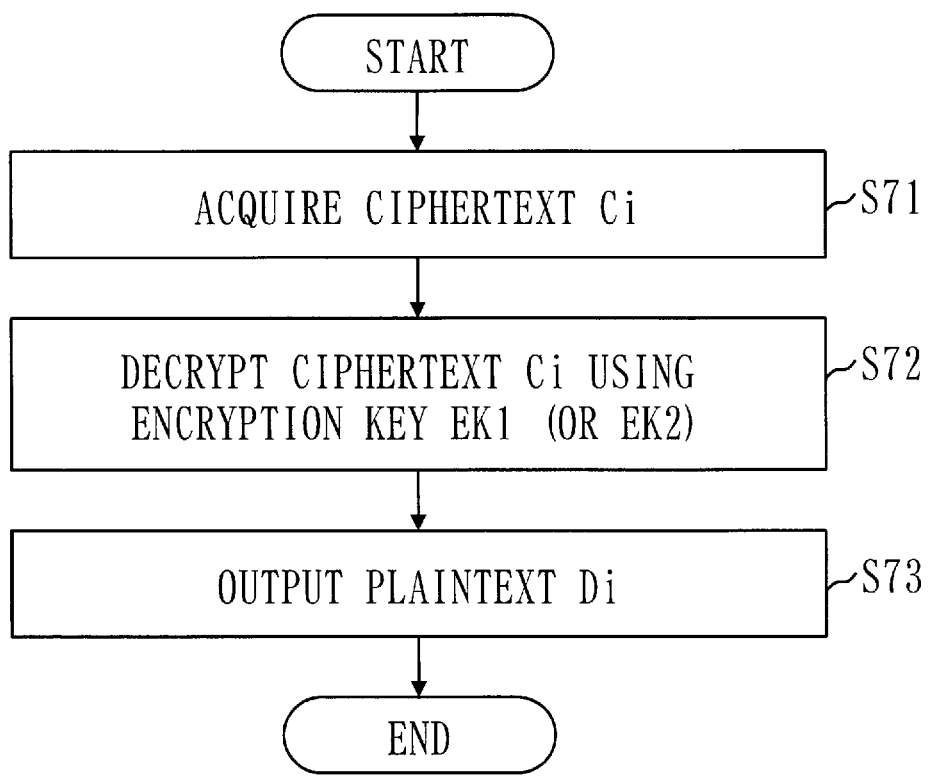
FIG. 13 is a flowchart illustrating operations of the search device according to Embodiment 1.

FIG. 13 illustrates operations of how the search device 300 acquires the search result.

In step S71, the request unit 340 receives the ciphertext transmitted from the server device 400. Specifically, in a case where the keyword w matches with the keyword W1, the request unit 340 of the search device 300a or search device 300b receives the ciphertext C1 from the server device 400. In a case where the keyword w matches with the keyword W2, the request unit 340 of the search device 300a or search device 300b receives the ciphertext C1 and ciphertext C2 from the server device 400. In a case where the keyword w matches with the keyword W3, the request unit 340 of the search device 300b receives the ciphertext C3 from the server device 400.

In step S72, the decryption unit 350 decrypts the ciphertext received by the request unit 340, with the encryption key. Specifically, if the ciphertext C1 is received in step S71, the decryption unit 350 of the search device 300a or search device 300b decrypts the ciphertext C1 with the encryption key EK1, and writes data obtained by the decryption in the memory 302 as the plaintext D1. If the ciphertext C2 is received in step S71, the decryption unit 350 of the search device 300a or search device 300b decrypts the ciphertext C2 with the encryption key EK1, and writes data obtained by the decryption in the memory 302 as the plaintext D2. If the ciphertext C3 is received in step S71, the decryption unit 350 of the search device 300b decrypts the ciphertext C3 with the encryption key EK2, and writes data obtained by the decryption in the memory 302 as the plaintext D3. Each encryption key is stored in the auxiliary storage device 303 in advance, or is inputted to the auxiliary storage device 303 as necessary via the input/output interface 304 or the communication device 305. In the present embodiment, the encryption key generated in step S12 is delivered, after step S12, to a corresponding searcher. In the example of FIG. 20, the encryption key EK1 is sent to the searcher Pa and the searcher Pb, and the encryption key EK2 is sent only to the searcher Pb. That is, the encryption key EK1 is transmitted from the registration device 200 to the search device 300a and the search device 300b, and the encryption key EK2 is transmitted from the registration device 200 only to the search device 300b. The encryption key EK1 transmitted from the registration device 200 is received by the search device 300a and the search device 300b before step S72. The encryption key EK2 transmitted from the registration device 200 is received by the search device 300b before step S72.

In step S73, the output unit 360 outputs the plaintext obtained by the decryption unit 350. Specifically, if the plaintext D1 is obtained in step S72, the output unit 360 of the search device 300a or search device 300b displays the plaintext D1 onto the screen or outputs the plaintext D1 to a file, via the input/output interface 204. If the plaintext D2 is obtained in step S72, the output unit 360 of the search device 300a or search device 300b outputs the plaintext D2 onto the screen or outputs the plaintext D2 to a file, via the input/output interface 204. If the plaintext D3 is obtained in step S72, the output unit 360 of the search device 300b displays the plaintext D3 onto the screen or outputs the plaintext D3 to a file, via the input/output interface 204.

How the index is generated will be described more specifically with referring to FIG. 15.

In step S14 and step S15, the index generation unit 230 of the registration device 200 executes a first conversion process and a second conversion process separately on result data obtained by encrypting the keyword inputted with the input unit 210 with the registration key. The index generation unit 230 utilizes first conversion data obtained by executing the first conversion process, as the encryption keyword. The index generation unit 230 generates the identification information by encoding second conversion data obtained by executing the second conversion process, with a ciphertext identifier. The ciphertext identifier is data that uniquely expresses a combination of ciphertexts corresponding to the keyword inputted to the input unit 210.

In the present embodiment, the first conversion process is a process of concatenating a first value to the result data, and calculating a hash value of data concatenated with the first value, as first conversion data. The second conversion process is a process of concatenating a second value which is different from the first value to the result data, and calculating a hash value of data concatenated with the second value, as second conversion data.

The first conversion process and the second conversion process suffice as far as they are processes different from each other. Various modifications may be made from the first conversion process and the second conversion process. In one example, the first conversion process is a process of converting the result data by a first hash function into the first conversion data which is a hash value. The second conversion process is a process of converting the result data by a second hash function different from the first hash function into the second conversion data which is a hash value.

In the present embodiment, encoding of the second conversion data is performed by calculating an exclusive OR of the second conversion data and the ciphertext identifier, as the identification information.

The following are definitions for symbols:
λ: security parameter;
W: keyword for registration;
w: keyword for search;
D: plaintext;
G1, G2, GT: cyclic group;
H1, H2: hash function; and
e: pairing function Each of G1, G2, and GT has a large prime number p as an order. A generator of G2 is g. Namely, $g^x \neq 1$ ($1 \leq x \leq p-1$) and $g^p = 1$.

The hash functions H1 and H2 are functions as follows.
H1: $\{0, 1\}^* \rightarrow G1$ (where $\{0, 1\}^*$ is an arbitrary bit string)
H2: $\{0, 1\}^* \rightarrow \{0, 1\}^\lambda$
The pairing function e is a function as follows.
e: $G1 \times G2 \rightarrow GT$
$e(H(w)^x, g^y) = e(H(w), g)^{xy}$ is established.

A specific procedure of generating an index is as follows.
1. The keywords W1, ..., WL different from each other are extracted from the plaintexts D1, ..., Dn where L is a positive integer.
2. An index ind_S={(keyword, identifier)} corresponding to a key sk_S is generated. Note that S signifies a set of pieces of attribute information indicating a searcher allowed to access the plaintexts D1, ..., Dn. For example, if the searcher Pa and searcher Pb are allowed to access the plaintext D1, ..., Dn, then S={Pa, Pb}. In this case, according to the example of FIG. 20, then S=S1 and sk_S=SK1.
3. An identifier corresponding to each keyword is expressed in vector notation. For example, when a number n of plaintext satisfies n=5 and an output bit length λ of the hash function H2 satisfies λ=10, that the plaintexts D1, D3, and D5 correspond to the keyword W1 is expressed as
   (1,0.1,0,1,0,0,0,0,0)
That the plaintexts D2 and D3 correspond to the keyword WL is expressed as
   (0,1,1,0,0,0,0,0,0,0)
That is, the number in order of each vector corresponds to an identifier of a plaintext that hits. When the identifiers of the plaintexts D1, D3, and D5 hit, a first, third, and fifth components of the vector are 1, and all other components are 0. At this time, ind_S={(W1, (1, 0, 1, 0, 1, 0, 0, 0, 0, 0)), ..., (WL, (0, 1, 1, 0, 0, 0, 0, 0, 0, 0))} is constituted.
4. For each Wi ($1 \leq i \leq L$), following t{i, 0} and t{i, 1} are calculated with using the pairing function e and the hash functions H1 and H2.

$$t\{i,0\} = H2(e(H1(Wi), g^{sk\_S}) \| 0)$$

$$t\{i,1\} = H2(e(H1(Wi), g^{sk\_S}) \| 1)$$

Note that "||" expresses concatenation. The calculation of t{i, 0} is the first conversion process. The calculation of t{i, 1} is the second conversion process. In this example, the first value is 0, and the second value is 1. The hash function H1 and the hash function H2 may be the same function.
5. For each Wi ($1 \leq i \leq L$), a hash value of t{i, 1} is expressed in vector notation. For example, if t{1, 1}=1010101010, it will be expressed as
   (1,0,1,0,1,0,1,0,1,0)
If t{L, 1}=1111100000, it will be expressed as
   (1,1,1,1,1,0,0,0,0,0)
6. For the identifier of each Wi ($1 \leq i \leq L$), an exclusive OR of t{i, 1} expressed in vector notation and each component is calculated. For example, regarding W1, (1,0,1,0,1,0,0,0,0,0)+(1,0,1,0,1,0,1,0,1,0)=(0,0,0,0,0,0,1,0,1,0)

is calculated. The calculated vector is defined as T {1, 1}. For WL, (0,1,1,0,0,0,0,0,0,0)+(1,1,1,1,1,0,0,0,0,0)=(1,0,0,1,1,0,0,0,0,0)

is calculated. The calculated vector is defined as T {L, 1}.
7. As illustrated in FIG. 15, ind_S is updated, and IND_S= (ind_S, S) is outputted.

How to search an index, which corresponds to how to generate the index described above, will be described with referring to FIG. 16.

In step S62 to step S64, the search unit 440 of the server device 400 executes the first conversion process and the second conversion process separately on result data obtained by re-encrypting the search query transmitted from the search device 300. The search unit 440 utilizes first conversion data obtained by executing the first conversion process, as the re-encryption keyword. When the encryption keyword is obtained as a search result, the search unit 440 acquires the ciphertext identifier by decrypting second conversion data obtained by executing the second conversion process with the identification information. Then, the search unit 440 extracts, from the plurality of ciphertexts registered by the management unit 420, a ciphertext included in a combination expressed by the acquired ciphertext identifiers.

As described above, in the present embodiment, the first conversion process is the process of concatenating the first value to the result data, and calculating the hash value of the data concatenated with the first value, as first the conversion data. The second conversion process is the process of concatenating the second value which is different from the first value to the result data, and calculating the hash value of data concatenated with the second value, as the second conversion data.

In the present embodiment, decryption of the second conversion data is performed by calculating an exclusive OR of the second conversion data and the identification information, as the ciphertext identifier.

A specific procedure of searching an index is as follows.
1. With respect to a search query q_U and a conversion key ck_U, following t0 and t1 are calculated with using the pairing function e and the hash functions H1 and H2.

$$t0=H2(e(q\_U,ck\_U)\|1)=H2(e(H1(w),g^{sk\_S})\|0)$$

$$t1=H2(e(q\_U,ck\_U)\|1)=H2(e(H1(w),g^{sk\_S})\|1)$$

2. It is checked whether key that satisfies t0=key with respect to index ind_S={(key, value)} exists, with using binary comparison or the like.
3. If such key does not exist, ID=0 (empty set) is outputted. If such key exists, with respect to (key, value) and value corresponding to that key, an exclusive OR of value and a value expressing t1 in vector notation is calculated, and ID is outputted to include in ID all identifiers each corresponding to a portion where the component is 1. For example, it is assumed that ind_S is as illustrated in FIG. 16 and that t{1, 0}=t0 and t1=(1, 0, 1, 0, 1, 0, 1, 0). In this case, an exclusive OR of (0, 0, 0, 0, 0, 1, 0, 1, 0) corresponding to t{t, 0} and t1=(1, 0, 1, 0, 1, 0, 1, 0, 1, 0) is calculated per component so as to obtain (1, 0, 1, 0, 1, 0, 0, 0, 0, 0). Hence, ID is outputted to include in ID the identifiers of plaintexts D1, D3, and D5.

By employing the above index technique, the security can be improved.

* Description of Effect of Embodiment*

The present invention can achieve high-speed searchable encryption while achieving access control using a plurality of keys, since it employs an index-type scheme. In addition, the present invention has a high versatility since it can employ most of common-key based index schemes.

In the present embodiment, particularly, access control in the common-key encryption-based searchable encryption technique can be realized with using the public key cryptography technique and a plurality of private keys. As the public key cryptography technique, a proxy re-encryption technique by means of pairing is employed. In the proxy re-encryption technique, if a certain conversion key is used, data encrypted by a searcher can be converted, without decryption, into data encrypted by a registrant.

In the present embodiment, not tag-type data but index-type data is generated in data registration, and an index-type search query is generated in data search. Hence, the efficiency is high.

In the present embodiment, in data registration, the same encryption keywords are registered together in the index, and higher security is achieved by employing an existing secure index construction scheme. For example, a scheme of adding a dummy to an index, a scheme of encrypting and thereby hiding a name of data that hits, and the like can be employed.

Since the present embodiment can be applied to the existing common-key encryption-based index-type scheme, an index scheme with a flexible search function such as partial match search can be constructed.

* Other Configurations*

In the present embodiment, the functions of the input unit 210, ciphertext generation unit 220, index generation unit 230, key generation unit 240, delivery unit 250, and registration unit 260 of the registration device 200 are implemented by software. According to a modification, the functions of the input unit 210, ciphertext generation unit 220, index generation unit 230, key generation unit 240, delivery unit 250, and registration unit 260 may be implemented by hardware. This modification will be described mainly regarding its difference from the present embodiment.

Figure 17:
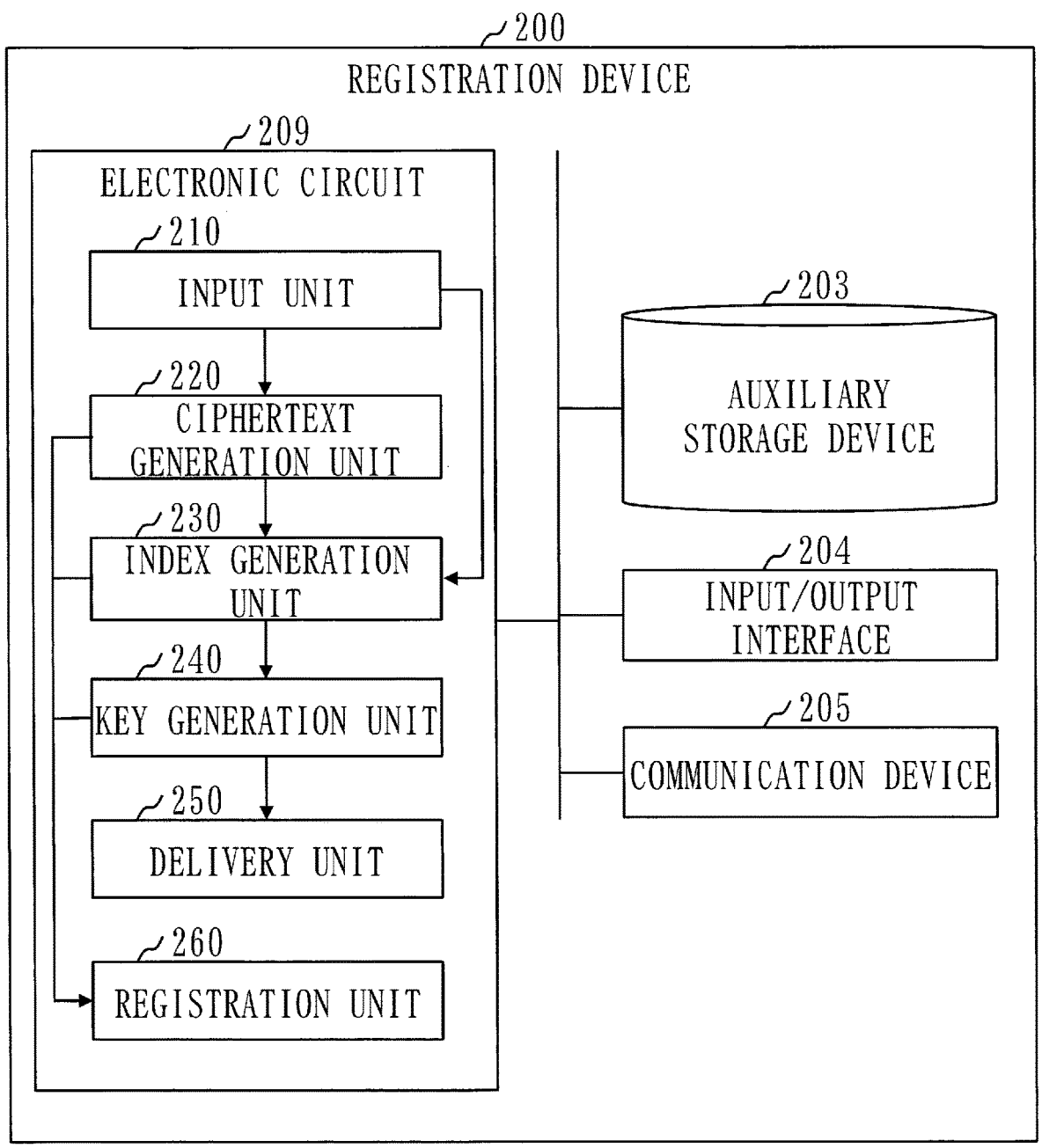
FIG. 17 is a block diagram illustrating a configuration of a registration device according to Embodiment 1.

A configuration of a registration device 200 according to the modification of the present embodiment will be described with referring to FIG. 17.

The registration device 200 is provided with hardware devices such as an electronic circuit 209, an auxiliary storage device 203, an input/output interface 204, and a communication device 205.

The electronic circuit 209 is dedicated hardware that implements functions of an input unit 210, ciphertext generation unit 220, index generation unit 230, key generation unit 240, delivery unit 250, and registration unit 260. The electronic circuit 209 is, for example, a single circuit, a composite circuit, a programmed processor, a parallel-programmed processor, a logic IC, a GA, an FPGA, or an ASIC; or a combination of some or all of a logic IC, a GA, an FPGA, and an ASIC. Note that IC stands for Integrated Circuit, GA stands for Gate array, FPGA stands for Field-Programmable Gate Array, and ASIC stands for Application Specific Integrated Circuit.

The registration device 200 may be provided with a plurality of electronic circuits that substitute for the electronic circuit 209. The plurality of electronic circuits implement as a whole the functions of the input unit 210, ciphertext generation unit 220, index generation unit 230, key generation unit 240, delivery unit 250, and registration unit 260. Each electronic circuit is, for example, a single circuit, a composite circuit, a programmed processor, a parallel-programmed processor, a logic IC, a GA, an FPGA, or an ASIC; or a combination of some or all of a single circuit, a composite circuit, a programmed processor, a parallel-programmed processor, a logic IC, a GA, an FPGA, and an ASIC.

According to another modification, the functions of the input unit 210, ciphertext generation unit 220, index generation unit 230, key generation unit 240, delivery unit 250, and registration unit 260 may be implemented by a combination of software and hardware. Namely, some of the functions of the input unit 210, ciphertext generation unit 220, index generation unit 230, key generation unit 240, delivery unit 250, and registration unit 260 may be implemented by dedicated hardware, and the remaining functions may be implemented by software.

Each of the processor 201 and the electronic circuit 209 is processing circuitry. That is, regardless of whether the configuration of the registration device 200 may be the configuration illustrated in FIG. 2 or FIG. 17, operations of the input unit 210, ciphertext generation unit 220, index generation unit 230, key generation unit 240, delivery unit 250, and registration unit 260 are performed by processing circuitry.

In the present embodiment, the functions of the acquisition unit 310, input unit 320, encryption unit 330, request unit 340, decryption unit 350, and output unit 360 of the search device 300 are implemented by software. According to a modification, the functions of the acquisition unit 310, input unit 320, encryption unit 330, request unit 340, decryption unit 350, and output unit 360 may be implemented by hardware. This modification will be described mainly regarding its difference from the present embodiment.

Figure 18:
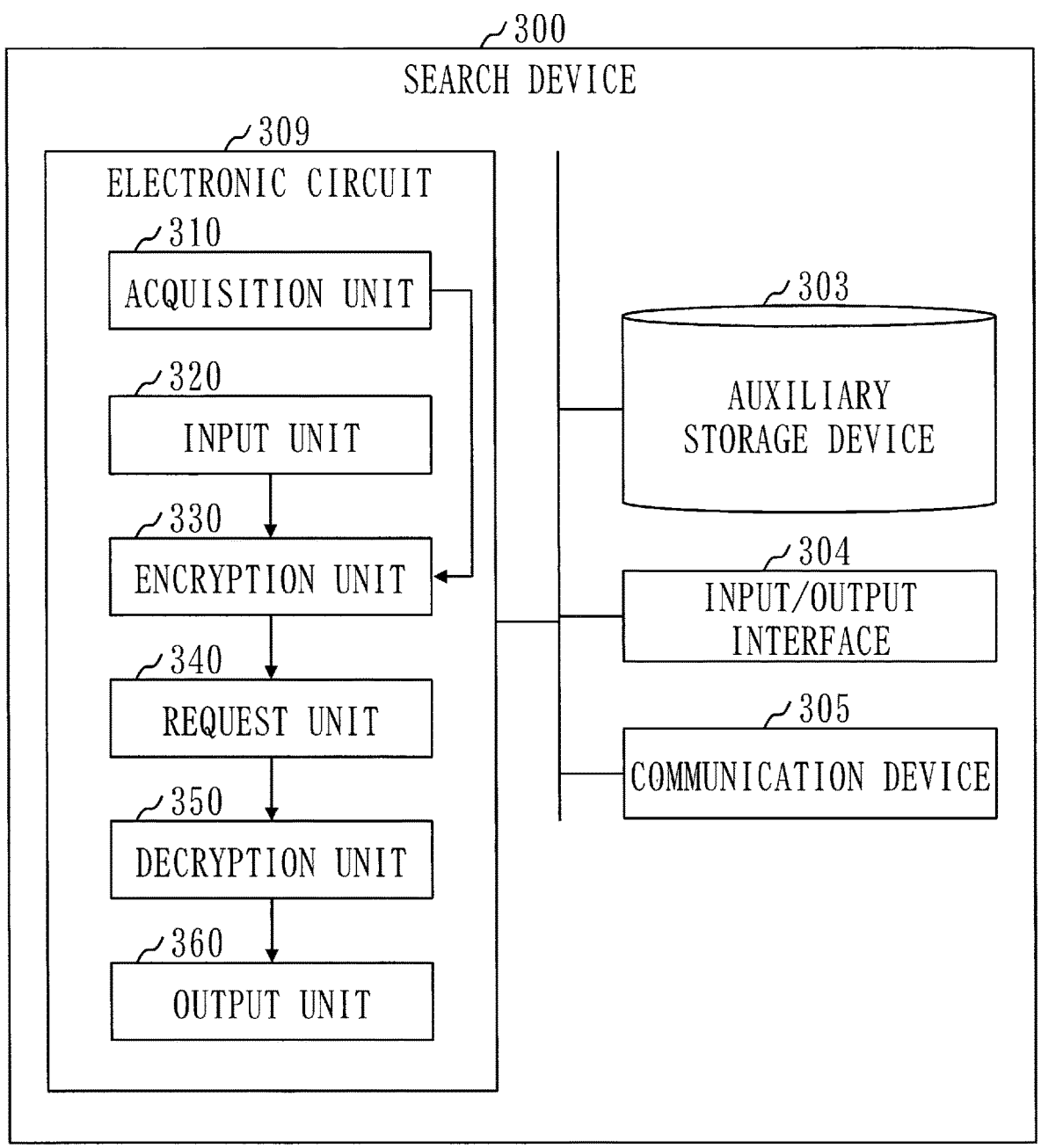
FIG. 18 is a block diagram illustrating a configuration of a search device according to Embodiment 1.

A configuration of a search device 300 according to a modification of the present embodiment will be described with referring to FIG. 18.

The search device 300 is provided with hardware devices such as an electronic circuit 309, an auxiliary storage device 303, an input/output interface 304, and a communication device 305.

The electronic circuit 309 is dedicated hardware that implements functions of an acquisition unit 310, input unit 320, encryption unit 330, request unit 340, decryption unit 350, and output unit 360. The electronic circuit 309 is, for example, a single circuit, a composite circuit, a programmed processor, a parallel-programmed processor, a logic IC, a GA, an FPGA, or an ASIC; or a combination of some or all of a single circuit, a composite circuit, a programmed processor, a parallel-programmed processor, a logic IC, a GA, an FPGA, and an ASIC.

The search device 300 may be provided with a plurality of electronic circuits that substitute for the electronic circuit 309. The plurality of electronic circuits implement as a whole the functions of the acquisition unit 310, input unit 320, encryption unit 330, request unit 340, decryption unit 350, and output unit 360. Each electronic circuit is, for example, a single circuit, a composite circuit, a programmed processor, a parallel-programmed processor, a logic IC, a GA, an FPGA, or an ASIC; or a combination of some or all of a single circuit, a composite circuit, a programmed processor, a parallel-programmed processor, a logic IC, a GA, an FPGA, and an ASIC.

According to another modification, the functions of the acquisition unit 310, input unit 320, encryption unit 330, request unit 340, decryption unit 350, and output unit 360 may be implemented by a combination of software and hardware. Namely, some of the functions of the acquisition unit 310, input unit 320, encryption unit 330, request unit 340, decryption unit 350, and output unit 360 may be implemented by dedicated hardware, and the remaining functions may be implemented by software.

Each of the processor 301 and the electronic circuit 309 is processing circuitry. That is, regardless of whether the configuration of the search device 300 may be the configuration illustrated in FIG. 3 or FIG. 18, operations of the acquisition unit 310, input unit 320, encryption unit 330, request unit 340, decryption unit 350, and output unit 360 are performed by processing circuitry.

In the present embodiment, the functions of the first receiving unit 410, management unit 420, second receiving unit 430, search unit 440, and transmission unit 450 of the server device 400 are implemented by software. According to a modification, the functions of the first receiving unit 410, management unit 420, second receiving unit 430, search unit 440, and transmission unit 450 may be implemented by hardware. This modification will be described mainly regarding its difference from the present embodiment.

Figure 19:
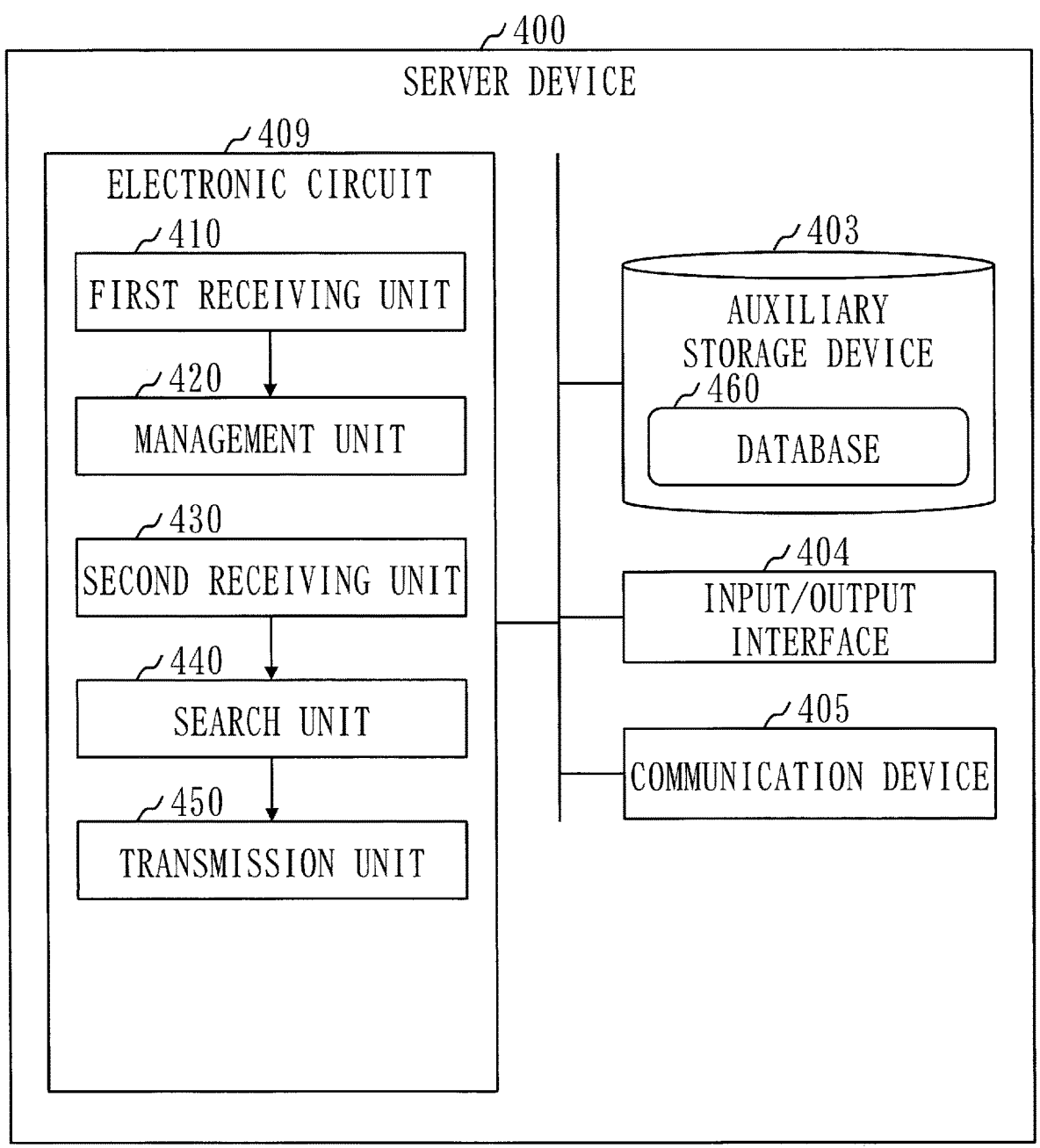
FIG. 19 is a block diagram illustrating a configuration of a server device according to Embodiment 1.

A configuration of a server device 400 according to the modification of the present embodiment will be described with referring to FIG. 19.

The server device 400 is provided with hardware devices such as an electronic circuit 409, an auxiliary storage device 403, an input/output interface 404, and a communication device 405.

The electronic circuit 409 is dedicated hardware that implements functions of a first receiving unit 410, management unit 420, second receiving unit 430, search unit 440, and transmission unit 450. The electronic circuit 409 is, for example, a single circuit, a composite circuit, a programmed processor, a parallel-programmed processor, a logic IC, a GA, an FPGA, or an ASIC; or a combination of some or all of a single circuit, a composite circuit, a programmed processor, a parallel-programmed processor, a logic IC, a GA, an FPGA, and an ASIC.

The server device 400 may be provided with a plurality of electronic circuits that substitute for the electronic circuit 409. The plurality of electronic circuits implement as a whole the functions of the first receiving unit 410, management unit 420, second receiving unit 430, search unit 440, and transmission unit 450. Each electronic circuit is, for example, a single circuit, a composite circuit, a programmed processor, a parallel-programmed processor, a logic IC, a GA, an FPGA, or an ASIC; or a combination of some or all of a single circuit, a composite circuit, a programmed processor, a parallel-programmed processor, a logic IC, a GA, an FPGA, and an ASIC.

According to another modification, the functions of the first receiving unit 410, management unit 420, second receiving unit 430, search unit 440, and transmission unit 450 may be implemented by a combination of software and hardware. Namely, some of the functions of the first receiving unit 410, management unit 420, second receiving unit 430, search unit 440, and transmission unit 450 may be implemented by dedicated hardware, and the remaining functions may be implemented by software.

Each of the processor 401 and the electronic circuit 409 is processing circuitry. That is, regardless of whether the configuration of the server device 400 may be the configuration illustrated in FIG. 4 or FIG. 19, operations of the first receiving unit 410, management unit 420, second receiving unit 430, search unit 440, and transmission unit 450 are performed by processing circuitry.

REFERENCE SIGNS LIST

100: searchable encryption system; 101: network; 200: registration device; 201: processor; 202: memory; 203: auxiliary storage device; 204: input/output interface; 205: communication device; 209: electronic circuit; 210: input unit; 220: ciphertext generation unit; 230: index generation unit; 240: key generation unit; 250: delivery unit; 260: registration unit; 300: search device; 300a: search device;

300b: search device; 301: processor; 302: memory; 303: auxiliary storage device; 304: input/output interface; 305: communication device; 309: electronic circuit; 310: acquisition unit; 320: input unit; 330: encryption unit; 340: request unit; 350: decryption unit; 360: output unit; 400: server device; 401: processor; 402: memory; 403: auxiliary storage device; 404: input/output interface; 405: communication device; 409: electronic circuit; 410: first receiving unit; 420: management unit; 430: second receiving unit; 440: search unit; 450: transmission unit; 460: database; 461: database; 462: database.

The invention claimed is:

1. A registration device comprising:
   processing circuitry
   to generate an encryption keyword by encrypting a keyword corresponding to at least one ciphertext among a plurality of ciphertexts, with a particular registration key, and to generate an index including the generated encryption keyword and identification information which identifies the at least one ciphertext;
   to generate a conversion key to be used for proxy re-encryption by a server device, from the registration key and a search key which is used for encryption by a search device that generates a search query by encrypting a keyword to be used for search,
   the server device generating a re-encryption keyword by re-encrypting the search query and searching the index with the re-encryption keyword; and
   to transmit the plurality of ciphertexts, the generated index, and the generated conversion key, to the server device,
   wherein the plurality of ciphertexts are transmitted to the registration device by multiple registrants, the multiple registrants being associated with multiple registration keys, respectively, the at least one ciphertext being registered by a particular one of the multiple registrants that is associated with the particular registration key from among the multiple registration keys,
   wherein the processing circuitry executes a first conversion process and a second conversion process which is different from the first conversion process, separately on result data obtained by encrypting the keyword corresponding to the at least one ciphertext with the registration key, utilizes first conversion data obtained by executing the first conversion process, as the encryption keyword, and generates the identification information by encoding second conversion data obtained by executing the second conversion process, with a ciphertext identifier which uniquely expresses a combination of the at least one ciphertext.

2. The registration device according to claim 1,
   wherein the first conversion process is a process of concatenating a first value to the result data, and calculating a hash value of data concatenated with the first value, as the first conversion data, and
   wherein the second conversion process is a process of concatenating a second value which is different from the first value to the result data, and calculating a hash value of data concatenated with the second value, as the second conversion data.

3. The registration device according to claim 2,
   wherein the processing circuitry calculates an exclusive OR of the second conversion data and the ciphertext identifier, as the identification information.

4. The registration device according to claim 1,
   wherein the processing circuitry calculates an exclusive OR of the second conversion data and the ciphertext identifier, as the identification information.

5. A server device comprising:
   processing circuitry
   to receive from a registration device a plurality of ciphertexts, a plurality of indexes, and a plurality of conversion keys which are to be used for proxy re-encryption, the indexes being generated for a respective plurality of registrants by the registration device that generates for each of the registrants an encryption keyword by encrypting a keyword corresponding to at least one ciphertext being registered by the corresponding registrant, with a registration key associated with the corresponding registrant, the index for the corresponding registrant being generated to include the encryption keyword and identification information which identifies the at least one ciphertext, the conversion keys being generated by the registration device for the respective registrants, each of the conversion keys being generated from the registration key of the corresponding registrant and a search key which is used for encryption by a search device that generates a search query by encrypting a keyword to be used for search;
   to register, in a database, the received plurality of ciphertexts, the received indexes, and the received conversion keys;
   to receive the search query;
   to generate a re-encryption keyword by re-encrypting the received search query, with the registered conversion key associated with a particular one of the registrants, to search the registered index of the particular registrant with the re-encryption keyword, and to acquire, from the searched index, the identification information identifying at least one ciphertext registered by the particular registrant if the corresponding encryption keyword is obtained as a search result, and to extract the ciphertext identified by the acquired identification information from the plurality of registered ciphertexts; and
   to transmit the extracted ciphertext to the search device,
   wherein the processing circuitry executes a first conversion process and a second conversion process which is different from the first conversion process, separately on result data obtained by re-encrypting the search query, utilizes first conversion data obtained by executing the first conversion process, as the re-encryption keyword, and if the corresponding encryption keyword is obtained as the search result, acquires a ciphertext identifier that uniquely expresses a combination of the at least one ciphertext registered by the particular registrant, by decrypting second conversion data obtained by executing the second conversion process, with the acquired identification information, and extracts a ciphertext included in the combination expressed by the ciphertext identifier, from the plurality of ciphertexts.

6. The server device according to claim 5,
   wherein the first conversion process is a process of concatenating a first value to the result data, and calculating a hash value of data concatenated with the first value, as the first conversion data, and
   wherein the second conversion process is a process of concatenating a second value which is different from the first value to the result data, and calculating a hash value of data concatenated with the second value, as the second conversion data.

7. The server device according to claim 6,
wherein the processing circuitry calculates an exclusive OR of the second conversion data and the information identifier, as the ciphertext identifier.

8. The server device according to claim 5,
wherein the processing circuitry calculates an exclusive OR of the second conversion data and the information identifier, as the ciphertext identifier.

9. A searchable encryption system comprising:
the registration device;
the search device; and
the server device according to claim 5.

10. A searchable encryption system comprising:
the registration device;
the search device; and
the server device according to claim 6.

11. A searchable encryption system comprising:
the registration device;
the search device; and
the server device according to claim 8.

12. A searchable encryption system comprising:
the registration device;
the search device; and
the server device according to claim 7.

13. A searchable encryption method comprising:
generating an encryption keyword by encrypting a keyword corresponding to at least one ciphertext among a plurality of ciphertexts, with a registration key, generating an index including the generated encryption keyword and identification information which identifies the at least one ciphertext, generating a conversion key to be used for proxy re-encryption, from the registration key and a search key which is used for encryption, and transmitting the plurality of ciphertexts, the generated index, and the generated conversion key;
registering the plurality of ciphertexts, the index, and the conversion key in a database;
generating a search query by encrypting a keyword to be used for search, and transmitting the generated search query; and
generating a re-encryption keyword by re-encrypting the search query with the conversion key registered in the database, searching the index registered in the database with the re-encryption keyword, and if the encryption keyword is obtained as a search result, acquiring, from the index, the identification information, extracting a ciphertext identified by the identification information from the plurality of ciphertexts registered in the database, and transmitting the extracted ciphertext,
wherein the plurality of ciphertexts are transmitted to a same registration device by multiple registrants, the multiple registrants being associated with multiple registration keys, respectively, the at least one ciphertext being registered by a particular one of the multiple registrants that is associated with the particular registration key from among the multiple registration keys,
wherein a first conversion process and a second conversion process which is different from the first conversion process, are executed separately on result data obtained by encrypting the keyword corresponding to the at least one ciphertext with the registration key, first conversion data obtained by executing the first conversion process is utilized as the encryption keyword, and the identification information is generated by encoding second conversion data obtained by executing the second conversion process, with a ciphertext identifier which uniquely expresses a combination of the at least one ciphertext.

* * * * *